US 10,288,021 B2

(12) United States Patent
Luehrsen et al.

(10) Patent No.: US 10,288,021 B2
(45) Date of Patent: May 14, 2019

(54) METHOD OF CONTROLLING ASPIRATOR MOTIVE FLOW

(71) Applicant: Ford Global Technologies, LLC, Dearborn, MI (US)

(72) Inventors: Eric Luehrsen, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 685 days.

(21) Appl. No.: 14/611,884

(22) Filed: Feb. 2, 2015

(65) Prior Publication Data

US 2016/0222929 A1 Aug. 4, 2016

(51) Int. Cl.
| F02M 35/10 | (2006.01) |
| B60T 13/46 | (2006.01) |
| B60T 17/02 | (2006.01) |
| B60T 17/04 | (2006.01) |

(52) U.S. Cl.
CPC ....... F02M 35/10229 (2013.01); B60T 13/46 (2013.01); B60T 17/02 (2013.01); B60T 17/04 (2013.01); *F02M 35/10157* (2013.01)

(58) Field of Classification Search
CPC ....... F02M 35/10229; F02M 35/10222; F02M 35/10321; F02M 35/10255; F02M 35/10157; Y02T 10/144; Y02T 10/42; B60T 13/46; B60T 13/52; F02D 2250/41; F02D 41/0007; F02D 2009/024; F02D 2200/0406
See application file for complete search history.

(56) References Cited

U.S. PATENT DOCUMENTS

| 4,380,418 | A | | 4/1983 | Crawford et al. | |
| 5,035,228 | A | * | 7/1991 | Bender | F02M 26/55 |
| | | | | | 123/568.31 |
| 5,427,079 | A | * | 6/1995 | Andrepont, Jr. | F01N 3/20 |
| | | | | | 123/561 |
| 5,542,388 | A | * | 8/1996 | Ichinose | F02B 31/085 |
| | | | | | 123/179.18 |
| 6,035,881 | A | | 3/2000 | Emmerich et al. | |
| 6,220,271 | B1 | | 4/2001 | Emmerich et al. | |
| 6,370,935 | B1 | | 4/2002 | He et al. | |
| 7,627,407 | B2 | * | 12/2009 | Hirooka | B60T 17/02 |
| | | | | | 123/200 |
| 7,634,348 | B2 | * | 12/2009 | Hirooka | B60K 6/48 |
| | | | | | 701/103 |

(Continued)

OTHER PUBLICATIONS

Luehrsen, E. et al., "Method of Controlling Aspirator Motive Flow," U.S. Appl. No. 14/611,923, filed Feb. 2, 2015, 87 pages.

(Continued)

*Primary Examiner* — Stephen K Cronin
*Assistant Examiner* — Carl C Staubach
(74) *Attorney, Agent, or Firm* — Julia Voutyras; McCoy Russell LLP

(57) ABSTRACT

Methods and systems are provided for controlling an aspirator shut-off valve in a boosted engine. One example method includes increasing an opening of the aspirator shut-off valve to allow motive flow through an aspirator in response to engine speed between a first, lower speed and a second, higher speed. As such, control of the aspirator shut-off valve may be simplified.

16 Claims, 13 Drawing Sheets

(56) References Cited

U.S. PATENT DOCUMENTS

| | | | | |
|---|---|---|---|---|
| 7,650,221 | B2* | 1/2010 | Oi | F02D 9/02 |
| | | | | 123/339.14 |
| 7,848,870 | B2 | 12/2010 | Hirooka | |
| 8,360,739 | B2* | 1/2013 | Hirooka | B60T 13/52 |
| | | | | 303/114.3 |
| 8,978,456 | B2 | 3/2015 | Pursifull et al. | |
| 9,371,074 | B1* | 6/2016 | Luehrsen | B60W 50/02 |
| 9,599,075 | B2* | 3/2017 | Luehrsen | F02M 35/10118 |
| 9,714,614 | B2* | 7/2017 | Luehrsen | F02D 13/02 |
| 2004/0055299 | A1* | 3/2004 | Bernard | F02B 37/16 |
| | | | | 60/611 |
| 2007/0295303 | A1* | 12/2007 | Hirooka | B60T 17/02 |
| | | | | 123/339.23 |
| 2009/0043477 | A1* | 2/2009 | Oi | F02D 9/02 |
| | | | | 701/103 |
| 2010/0241323 | A1* | 9/2010 | Cunningham | F02D 37/02 |
| | | | | 701/54 |
| 2011/0232598 | A1* | 9/2011 | Harada | F02M 29/00 |
| | | | | 123/184.47 |
| 2013/0192202 | A1 | 8/2013 | Lambert et al. | |
| 2013/0249275 | A1* | 9/2013 | Pursifull | B60T 13/46 |
| | | | | 303/12 |
| 2013/0340732 | A1 | 12/2013 | Pursifull et al. | |
| 2014/0076249 | A1 | 3/2014 | Rollinger et al. | |
| 2014/0081549 | A1 | 3/2014 | Rollinger et al. | |
| 2014/0081550 | A1 | 3/2014 | Jentz et al. | |
| 2014/0081551 | A1 | 3/2014 | Rollinger et al. | |
| 2014/0081564 | A1 | 3/2014 | Pursifull et al. | |
| 2014/0149015 | A1 | 5/2014 | Pursifull | |
| 2015/0040852 | A1 | 2/2015 | Pursifull | |
| 2015/0158477 | A1* | 6/2015 | Luehrsen | B60T 13/72 |
| | | | | 701/22 |
| 2016/0222890 | A1* | 8/2016 | Luehrsen | F02M 35/10386 |

OTHER PUBLICATIONS

Luehrsen, E. et al., "Method of Controlling Aspirator Motive Flow," U.S. Appl. No. 14/611,975, filed Feb. 2, 2015, 89 pages.

Ulrey, J. et al., "Method to Adjust Fuel Economy Readings for Stored Energy," U.S. Appl. No. 14/257,890, filed Apr. 24, 2014, 47 pages.

Luehrsen, E. et al., "Bidirectional Valved Aspirator for Surge Control and Vacuum Generation," U.S. Appl. No. 14/102,133, filed Dec. 10, 2013, 47 pages.

* cited by examiner

METHOD OF CONTROLLING ASPIRATOR MOTIVE FLOW

FIELD

The present invention relates to controlling motive flow through an ejector coupled to an engine system.

BACKGROUND AND SUMMARY

Vehicle systems may include various vacuum consumption devices that are actuated using vacuum. These may include, for example, a brake booster, a fuel vapor canister etc. Vacuum used by these devices may be provided by a dedicated vacuum pump. In still other embodiments, one or more aspirators (alternatively referred to as ejectors, venturi pumps, jet pumps, and eductors) may be coupled in the engine system that may harness engine air flow and use it to generate vacuum.

Since aspirators are passive devices, they provide low-cost vacuum generation when utilized in engine systems. An amount of vacuum generated at an aspirator can be controlled by controlling the motive air flow rate through the aspirator. While aspirators may generate vacuum at a lower cost and with improved efficiency as compared to electrically-driven or engine-driven vacuum pumps, their use in engine intake systems has traditionally been constrained by both available intake manifold vacuum and maximum throttle bypass flow. Some approaches for addressing this issue involve arranging a valve in series with an aspirator, or incorporating a valve into the structure of an aspirator. Such valves may be referred to as aspirator shut-off valves (ASOVs) or aspirator control valves (ACVs). An opening amount of the valve is regulated to control the motive air flow rate through the aspirator, and thereby control an amount of vacuum generated at the aspirator. By controlling the opening amount of the valve, the amount of air flowing through the aspirator and the suction air flow rate can be varied, thereby adjusting vacuum generation as engine operating conditions, such as intake manifold pressure, change.

An example approach of controlling motive flow rate through the aspirator is shown by Emmerich et al. in U.S. Pat. No. 6,220,271. Herein, a solenoid operated ASOV controls motive flow through the aspirator based on a pressure (or a vacuum level) in a brake booster. When vacuum level in the brake booster decreases below a threshold, the ASOV is opened to enable vacuum generation at the aspirator. The vacuum generated at the aspirator is then supplied to the brake booster.

The inventors herein have identified potential issues with the above approach to motive flow control. For example, opening the ASOV for vacuum generation during certain engine conditions may adversely affect emissions. Further, by controlling the ASOV based on a pressure in the brake booster, the operation of the ASOV and the aspirator may not be sufficiently tested during vehicle emissions testing procedures. Herein, the ASOV may not be actuated open during vehicle emissions testing (e.g. the U.S. Federal Test Procedure 1975) since sufficient brake booster vacuum may be available without exercising the ASOV.

The inventors herein have identified an approach to at least partly address the above issues. In one example approach, a method for an engine is provided comprising increasing an opening of an aspirator shut-off valve (ASOV) to allow motive flow through an aspirator in response to engine speed between a first, lower speed and a second, higher speed. In this way, the ASOV may be controlled independent of brake booster conditions and other ambient conditions.

For example, an engine may include an aspirator for passive vacuum generation. In one example, the engine may be naturally aspirated wherein the aspirator may be coupled in a throttle bypass passage across from an intake throttle coupled in an intake passage. In an alternative embodiment, the engine may be a boosted engine including a compressor wherein the aspirator may be coupled across a compressor in a compressor bypass passage. In yet another embodiment, the engine may be boosted with the aspirator coupled in the throttle bypass passage across from the intake throttle. Motive flow through the aspirator may be regulated by an aspirator control valve (ACV). A controller may activate the ACV to an open position when engine speed is between a first, lower speed and a second, higher speed. In one example, the first lower speed may be a speed based on a transmission lugging limit. In another example, the second, higher speed may be based on a redline speed for the engine. The controller may adjust the ACV towards a closed position if engine speed reduces below the first lower speed or if the engine speed increases above the second, higher speed. Thus, motive flow through the aspirator may be regulated based on engine speed and not an existing vacuum level in a brake booster.

In this way, ACV operation may be controlled for vacuum generation. Controlling the motive flow rate through the aspirator based on engine speed provides a more simplified control of the ACV. Further, by modulating the ACV based on engine speed, aspirator and ACV operation may be tested reliably during emissions testing procedures. Specifically, the ACV may be exercised during an example federal emissions testing procedure. Overall, with the simplified control algorithm for the ACV, a reduction in manufacturing costs may be achieved along with enhanced emissions compliance.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1A:
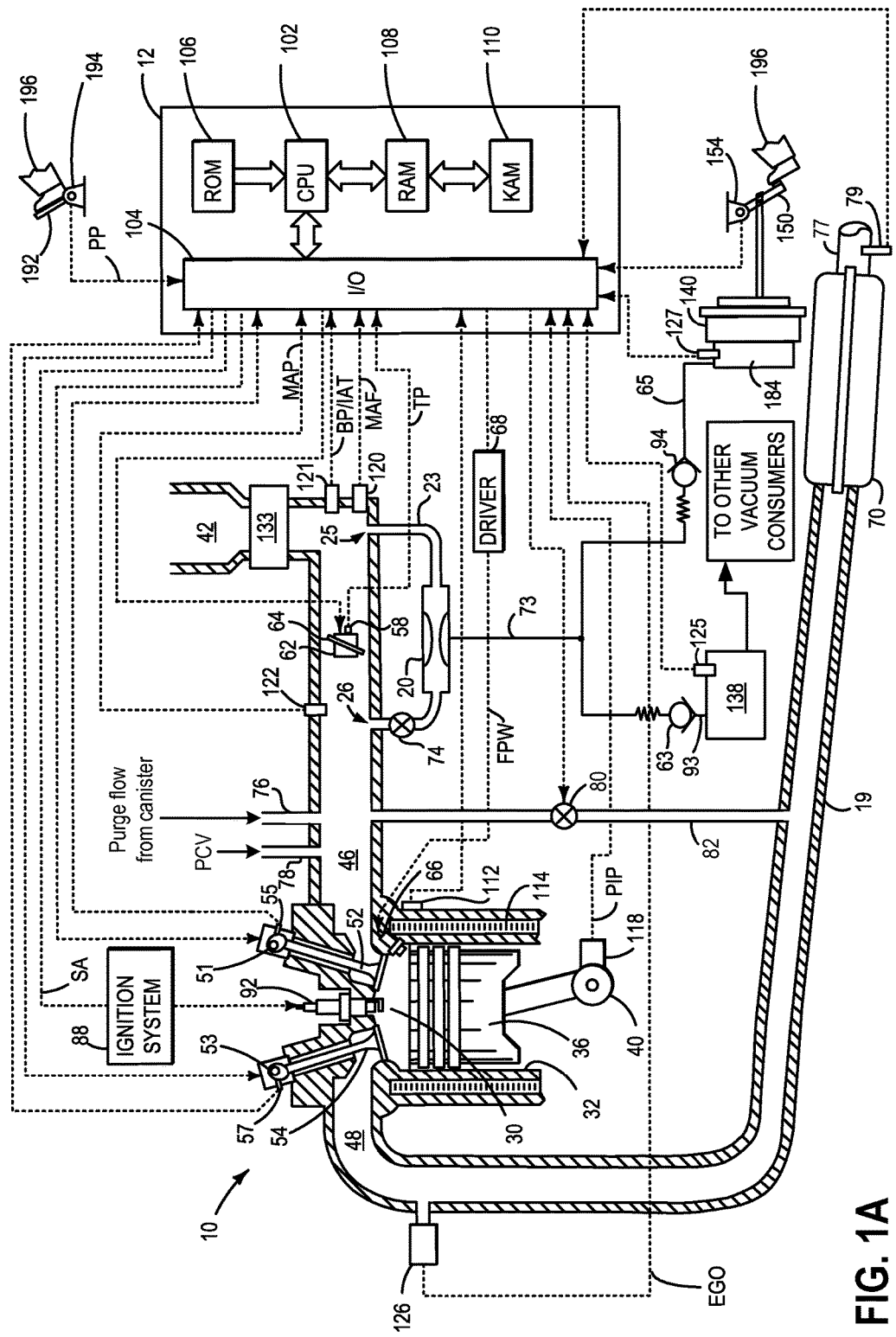
FIG. 1A portrays a schematic depiction of a naturally aspirated engine system including an aspirator.
Figure 1B:
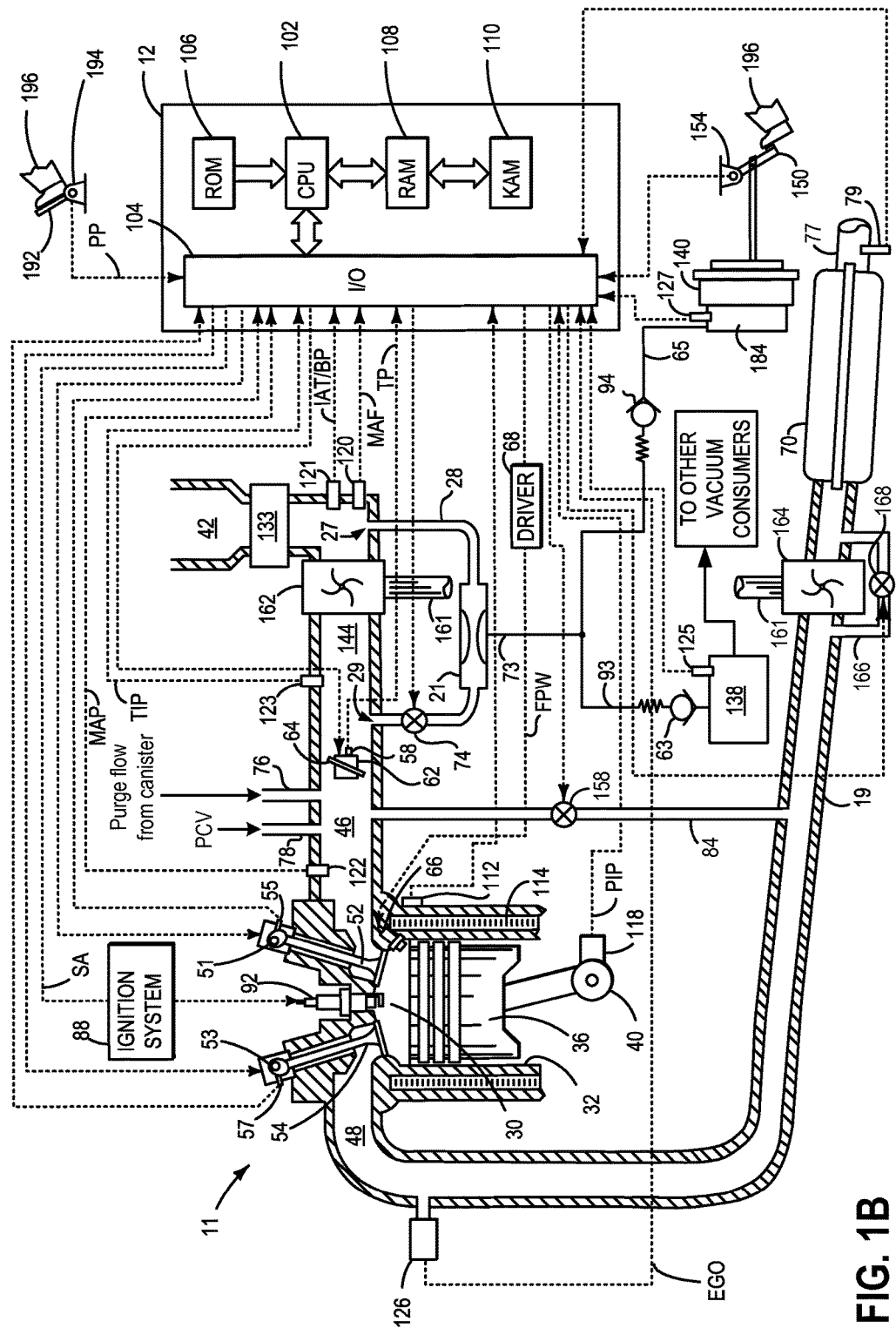
FIG. 1B illustrates a schematic depiction of a boosted engine system including an aspirator.

The following detailed description relates to methods and systems for generating vacuum at an aspirator coupled to an engine system, such as the naturally aspirated engine system of FIG. 1A and the forced induction engine system of FIG. 1B. The engine system may be included in a hybrid electric vehicle (HEV), such as the hybrid vehicle system shown in FIG. 2. Vacuum generation at the aspirator may be regulated by an aspirator shut-off valve (ASOV) coupled either upstream or downstream of the aspirator. As such, an opening of the ASOV may be adjusted to control motive flow through the aspirator, thus, controlling an amount of vacuum generated at the aspirator. A controller may be configured to perform one or more control routines, such as the example routines of FIGS. 3-10B, to open or close the ASOV based on engine conditions (FIGS. 3 and 4) such as engine speed (FIG. 6), a temperature of the ASOV (FIG. 8) which may depend on a current and voltage provided to the ASOV (FIG. 9), and engine conditions in the HEV system (FIG. 5). A change in engine conditions may determine whether a position of the ASOV is to be adjusted (FIG. 7). Additionally, the controller may modify the position of the ASOV based on determination of engine degradation conditions (FIGS. 10A and 10B). Example ASOV adjustments are described with reference to FIGS. 11-14.

Turning to FIG. 1A, it shows a schematic depiction of a spark ignition internal combustion engine 10. The embodiment of engine 10 shown in FIG. 1A includes a naturally aspirated engine and does not include a boosting device. Engine 10 comprises a plurality of cylinders of which one cylinder 30 (also known as combustion chamber 30) is shown in FIG. 1A.

Cylinder 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 46 via intake passage 42 and may exhaust combustion gases via exhaust manifold 48 and exhaust passage 19.

Intake manifold 46 and exhaust manifold 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The angular position of intake and exhaust camshafts may be determined by position sensors 55 and 57, respectively. Thus, the position of an intake cam may be determined by position sensor 55 while the position of an exhaust cam may be determined by position sensor 57.

In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown in FIG. 1A) including a fuel tank, a fuel pump, and a fuel rail. In some embodiments, combustion chamber 30 may alternatively or additionally include a fuel injector arranged in intake manifold 46 in a configuration that provides what is known as port injection of fuel into the intake port upstream of combustion chamber 30.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake manifold 46 is shown communicating with intake throttle 62 having a throttle plate 64. In this particular example, the position of throttle plate 64 may be varied by controller 12 via a signal provided to an electric motor or actuator included with intake throttle 62, a configuration that is commonly referred to as electronic throttle control (ETC). Intake throttle 62 may control air flow from intake passage 42 to intake manifold 46 and combustion chamber 30 among other engine cylinders. The position of throttle plate 64 may be provided to controller 12 by throttle position signal TP from throttle position sensor 58. The intake passage 42 may include a mass air flow sensor 120 and a barometric pressure sensor 121 for providing respective signals MAF and BP to the controller 12. Barometric pressure sensor 121 may also be configured as a temperature/pressure sensor enabling it to measure intake air temperature (IAT) as well as barometric pressure (BP).

Further, in the depicted embodiment, an exhaust gas recirculation (EGR) system may route a desired portion of exhaust gas from exhaust passage 19 to the intake manifold 46 via an EGR passage 82. The amount of EGR provided may be varied by controller 12 via an EGR valve 80. By introducing exhaust gas to the engine 10, the amount of available oxygen for combustion is decreased, thereby reducing combustion flame temperatures and reducing the formation of $NO_x$, for example.

A positive crankcase ventilation (PCV) conduit 78 may couple a crankcase (not shown) to the intake manifold 46 such that gases in the crankcase may be vented in a controlled manner from the crankcase. Further, evaporative emissions from a fuel vapor canister (not shown) may be purged into intake manifold 46 through a fuel vapor purge conduit 76 coupling the fuel vapor canister to the intake manifold.

Exhaust gas sensor 126 is shown coupled to exhaust passage 19 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 19 downstream of exhaust gas sensor 126. Device 70 may be a three way catalyst (TWC), NOx trap, various other emission control devices, or combinations thereof. Oxygen sensor 79 is shown coupled to tail pipe 77 downstream of emission control device 70. An oxygen content of the emission control device 70 may be estimated based on measurements from exhaust gas sensor 126 and oxygen sensor 79.

Aspirator 20 may be coupled in conduit 23 (herein also referred to as bypass air intake passage 23 or a throttle bypass passage 23) across from intake throttle 62. Conduit 23 may be parallel to intake passage 42, as shown in FIG. 1A, and may divert a portion of intake air received from downstream of air cleaner 133 to intake manifold 46 via aspirator 20. The portion of air diverted from upstream of intake throttle 62 may flow into first end 25 of conduit 23, through aspirator 20, and may exit into intake manifold 46 downstream of intake throttle 62 at second end 26 of conduit 23. Air flow through aspirator 20 creates a low pressure region within the aspirator 20, thereby providing a vacuum source for vacuum reservoirs and vacuum consumption devices such as fuel vapor canisters, brake boosters, etc. Aspirators (which may alternatively be referred to as ejectors, venturis, jet pumps, and eductors) are, therefore, passive vacuum generating devices which can provide low-cost vacuum generation when utilized in engine systems. The amount of vacuum generated may be dependent on a motive air flow rate through aspirator 20. An aspirator shut-off valve (ASOV) 74 may be coupled to conduit 23 downstream of aspirator 20, as shown in FIG. 1A. Alternatively, ASOV 74 may be coupled upstream of aspirator 20. In yet other embodiments, ASOV 74 may be integral to the aspirator 20 (e.g. the valve may be arranged at a throat of the aspirator). ASOV 74 may also be termed an aspirator control valve or ACV 74.

ASOV 74 may be actively controlled to allow/disallow motive flow through the aspirator (in the case of a binary ASOV) or to reduce/increase flow through the aspirator (in the case of a continuously variable ASOV). Thus, by adjusting an opening of ASOV 74, a motive flow through aspirator 20 can be varied, and an amount of vacuum drawn at aspirator throat can be modulated to meet engine vacuum requirements.

ASOV 74 may be an electrically actuated valve, and its state may be controlled by controller 12 based on various engine operating conditions. In one example, ASOV 74 may be a solenoid valve. Herein, the ASOV may be actuated by a flow of current. As such, a default position of the ASOV 74 may be a closed (or fully closed) position when no current is supplied to the electrically actuated ASOV. Accordingly, a change in the default position of the ASOV (e.g. an opening of ASOV 74) may be achieved by supplying current to the ASOV. As will be described in reference to FIG. 9, current and voltage values for actuating the ASOV may be determined based on an underhood soak temperature.

In alternative embodiments, the ASOV may be a pneumatic (e.g., vacuum-actuated) valve; herein, the actuating vacuum for the valve may be sourced from the intake manifold and/or vacuum reservoir and/or other low pressure sinks of the engine system. In embodiments where the ASOV is a pneumatically-controlled valve, control of the ASOV may be performed independent of a powertrain control module (e.g., the ASOV may be passively controlled based on pressure/vacuum levels within the engine system).

Whether it is actuated electrically or with vacuum, ASOV 74 may be either a binary valve (e.g. two-way valve) or a continuously variable valve. Binary valves may be controlled either fully open or fully closed (shut), such that a fully open position of a binary valve is a position in which the valve exerts no flow restriction, and a fully closed position of a binary valve is a position in which the valve restricts all flow such that no flow may pass through the valve. In contrast, continuously variable valves may be partially opened to varying degrees. Embodiments with a continuously variable ASOV may provide greater flexibility in control of the motive flow through the aspirator, with the drawback that continuously variable valves may be much more costly than binary valves. In still other examples, ASOV 74 may be a gate valve, pivoting plate valve, poppet valve, or another suitable type of valve.

The state of ASOV 74 (e.g., open or closed) may be determined based on various engine operating conditions as will be described in more detail in the disclosure with reference to FIGS. 3-14. Controller 12 may be operatively coupled to ASOV 74 to actuate ASOV 74 between an open or closed position (or to assume any position there-between for a continuously variable valve). In a first example, the controller may actuate the ASOV based on a vacuum level in a vacuum reservoir, such as a brake booster. For example, vacuum generation via the aspirator may be activated by actuating open the ASOV when vacuum levels in the brake booster are below a threshold. In a second example, the ASOV may be controlled based on a desired air flow in the engine intake. To elaborate, the ASOV may be closed when an air flow rate into the intake manifold is greater than desired which may result in extra fuel being injected. While the above examples of controlling the ASOV may be suitable for routine engine operation, these control methods may not allow sufficient testing of the aspirator or the ASOV during emissions testing procedures. As such, the ASOV may not be actuated during emissions testing and/or diagnostic procedures when ASOV control is based upon a vacuum level in the brake booster or upon a desired air flow in the intake.

Accordingly, the present disclosure describes ASOV control methods that are at least partially based on engine speed. For example, the controller may command the ASOV 74 to an open position (from a more closed position) when engine speed is between a first, lower speed and a second, higher speed. By opening the ASOV based on engine speed, conditions where the ejector motive flow can cause air flow greater than desired are reduced (e.g., minimized). Since an air flow rate that is greater than desired leads to extra fuel being injected, controlling air flow via the ASOV may improve engine performance and fuel economy. Further still, ASOV actuation during emissions testing procedures is assured when ASOV control is based on engine speed. Thus, diagnostics of the ASOV (and the aspirator) may be ensured while simultaneously assessing the impact of the ASOV (and aspirator) on emissions of the vehicle.

For an electrically actuated ASOV, the controller may also regulate the actuation of the ASOV based on a temperature of the ASOV. For example, the ASOV may be closed (from open) when the temperature of the ASOV is higher than a threshold. In yet another example, a different control algorithm for modulating the ASOV may be utilized based on detection of engine degradation conditions. An alternative control method may be employed for a hybrid electric vehicle.

Returning to FIG. 1A, vacuum generated by aspirator 20 may be directed to vacuum reservoir 138 and brake vacuum reservoir 184 (also termed, brake accumulator 184) in brake booster 140. Vacuum reservoir 138 may receive vacuum via passage 73 through first check valve 63 located in first conduit 93. The first check valve 63 allows air flow from vacuum reservoir 138 towards aspirator 20 and blocks air flow from aspirator 20 towards vacuum reservoir 138. Sensor 125 may estimate a level of pressure (or a level of vacuum) within vacuum reservoir 138. As such, sensor 125 may be a pressure sensor or a vacuum sensor. While the depicted embodiment shows first check valve 63 as a distinct valve, in alternate embodiments of the aspirator, check valve 63 may be integrated into the aspirator. Brake accumulator 184 may receive vacuum from aspirator 20 via passage 73 through second check valve 94 coupled in second conduit 65. An available pressure in the brake accumulator 184 may be estimated by a vacuum sensor 127 (or pressure sensor 127). Controller 12 may thus receive pressure level readings from each of sensor 125 and 127. In alternative embodiments, brake accumulator 184 may receive vacuum directly from vacuum reservoir 138.

Brake accumulator 184 may be an internal vacuum reservoir in brake booster 140 which in turn may be coupled to vehicle wheel brakes (not shown). The vacuum in brake accumulator 184 may amplify force provided by vehicle operator 196 via brake pedal 150 to master cylinder for applying vehicle brakes (not shown). A position of the brake pedal 150 may be monitored by a brake pedal sensor 154. Vacuum reservoir 138 may be coupled to one or more engine vacuum consumption devices. For example, the vacuum reservoir 138 may be coupled to one or more of a canister purge valve (not shown), a charge motion control valve (not shown), and a turbine wastegate actuator in a boosted engine (not shown in FIG. 1A).

Though not shown in FIG. 1A, in other examples, vacuum reservoir 138 and brake accumulator 184 may be directly coupled to intake manifold 46 via separate passages. That is, brake accumulator 184 may be directly coupled to intake manifold via a first passage distinct from a second passage directly coupling vacuum reservoir 138 to intake manifold 46. Further, the first and the second passages may not include aspirator 20 and may bypass aspirator 20. The vacuum reservoir 138 and brake accumulator 184 may receive vacuum from the intake manifold 46 when intake manifold vacuum is deeper than the vacuum generated at the aspirator or when the aspirator is not generating vacuum.

Controller 12 is shown in FIG. 1A as a conventional microcomputer including: microprocessor unit 102, input/output ports 104, read-only memory 106, random access memory 108, keep alive memory 110, and a conventional data bus. Controller 12 commands various actuators such as throttle plate 64, ASOV 74, EGR valve 80, fuel injector 66 and the like. Controller 12 is shown receiving various signals from sensors coupled to engine 10, in addition to those signals previously discussed, including: engine coolant temperature (ECT) from temperature sensor 112 coupled to cooling sleeve 114; position sensor 194 coupled to an accelerator pedal 192 for sensing accelerator position adjusted by vehicle operator 196; a measurement of engine manifold pressure (MAP) from pressure sensor 122 coupled to intake manifold 46; a measurement of intake air temperature and barometric pressure (BP) from temperature/pressure sensor 121 coupled to intake passage 42; a measurement of vacuum in brake vacuum reservoir 184 from pressure sensor 127, a measurement of vacuum in vacuum reservoir 138 from pressure sensor 125, a profile ignition pickup signal (PIP) from Hall effect sensor 118 (or other type) coupled to crankshaft 40; a measurement of air mass entering the engine from mass air flow sensor 120; and a measurement of throttle position from sensor 58.

Controller 12 may also receive communication from exhaust gas sensor 126 and oxygen sensor 79 which may be used to estimate an oxygen storage capacity of emission control device 70. Engine position sensor 118 may produce a predetermined number of equally spaced pulses every revolution of the crankshaft from which engine speed (RPM) can be determined. Storage medium read-only memory 106 in controller 12 can be programmed with computer readable data representing instructions executable by processor 102 for performing the methods described below, as well as other variants that are anticipated but not specifically listed. Example methods and routines are described herein with reference to FIGS. 3-10B.

FIG. 1B depicts an example engine system 11 including a boosted engine. Engine system 11 is similar to engine system 10 of FIG. 1A differing primarily in the positioning of the aspirator, and inclusion of a turbocharger and a high pressure exhaust gas recirculation (HP-EGR) conduit. Therefore, engine components previously introduced in FIG. 1A are numbered similarly in FIG. 1B and not reintroduced.

Engine 11 includes a compression device such as a turbocharger or supercharger including at least a compressor 162 arranged along intake passage 42. For a turbocharger, compressor 162 may be at least partially driven by an exhaust turbine 164 (e.g. via a shaft) arranged along exhaust passage 19. Compressor 162 draws air from intake passage 42 to supply boost chamber 144. Exhaust gases spin exhaust turbine 164 which is coupled to compressor 162 via shaft 161. For a supercharger, compressor 162 may be at least partially driven by the engine and/or an electric machine, and may not include an exhaust turbine. Thus, the amount of compression provided to one or more cylinders of the engine via a turbocharger or supercharger may be varied by controller 12.

A wastegate 168 may be coupled across exhaust turbine 164 in a turbocharger. Specifically, wastegate 168 may be included in a bypass passage 166 coupled between an inlet and outlet of the exhaust turbine 164. By adjusting a position of wastegate 168, an amount of boost provided by the exhaust turbine may be controlled.

Further, in the example engine system of FIG. 1B, aspirator 21 may be coupled in conduit 28 (herein also referred to as compressor bypass passage 28) across from compressor 162. Conduit 28 may be parallel to intake passage 42, as shown in FIG. 1B, and may divert a portion of boosted air from downstream of compressor 162 and upstream of intake throttle 62 to upstream of compressor 162 via aspirator 21. The portion of compressed air diverted from downstream of compressor 162 (and upstream of intake throttle 62) may flow into first end 29 of conduit 28, through aspirator 21, and may exit into intake passage 42 upstream of compressor 162 at second end 27 of conduit 28. Air flow through aspirator 21 creates a low pressure region within the aspirator 21, thereby providing a vacuum source for vacuum reservoirs and vacuum consumption devices such as fuel vapor canisters, brake boosters, etc. The amount of vacuum generated by aspirator may be dependent on a motive air flow rate through aspirator 21. An aspirator shut-off valve (ASOV) 74 may be coupled to compressor bypass passage 28 upstream of aspirator 21, as shown in FIG. 1B. Alternatively, ASOV 74 may be coupled downstream of aspirator 21. Further, ASOV 74 may be modulated by controller 12, as mentioned earlier in reference to FIG. 1A, to vary a level of vacuum generated at aspirator 21. As such, control of ASOV 74 may be based on engine speed, the temperature of the ASOV, and other conditions that will be described below in reference to FIGS. 3-14. Similar to FIG. 1A, vacuum generated at aspirator 21 may be supplied to each of vacuum reservoir 138 and brake accumulator 184.

It will be appreciated herein that though FIG. 1B shows aspirator 21 coupled across from compressor 162 in conduit 28 (or compressor bypass passage 28), other boosted engine embodiments may include aspirator 21 coupled across intake throttle 62 as shown in the example embodiment of the naturally aspirated engine of FIG. 1A. Alternative embodiments may include multiple ejectors coupled in different positions within the engine system. These multiple ejectors may be combined via check valves to provide desired levels of vacuum.

Engine 11 may include a high pressure EGR (HP-EGR) system for recirculating a portion of exhaust gas from the exhaust manifold to the intake manifold, specifically, from the engine exhaust, upstream of exhaust turbine 164, to intake manifold 46, downstream of each of intake throttle 62 and compressor 162. The HP-EGR system may include a HP-EGR conduit 84 and a HP-EGR valve 158 configured to control an amount of exhaust gas recirculated along HP-EGR conduit 84. Though not shown in FIG. 1B, engine 11 may also include a low pressure EGR (LP-EGR) system for recirculating a portion of exhaust gas from the exhaust manifold to the intake manifold, specifically, from the engine exhaust, downstream of exhaust turbine 164, to the engine intake, upstream of intake compressor 162.

Controller 12 of FIG. 1B may be similar to controller 12 shown in FIG. 1A. However, controller 12 of FIG. 1B may command HP-EGR valve 158 and wastegate 168 in addition to commands to various actuators such as throttle plate 64, ASOV 74, fuel injector 66 and the like. Further, controller 12 of FIG. 1B may receive signals from sensors previously introduced in FIG. 1A as well as a measurement of throttle inlet pressure (or boost pressure) from sensor 123 coupled to boost chamber 144 downstream of compressor 162 in engine 11.

It will be appreciated that though the present disclosure may refer to engine 10 in the following description, the remaining description may also apply to engine 11 of FIG. 1B unless specifically noted.

In some embodiments, the engine (e.g. engine 10 or engine 11) may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

Figure 2:
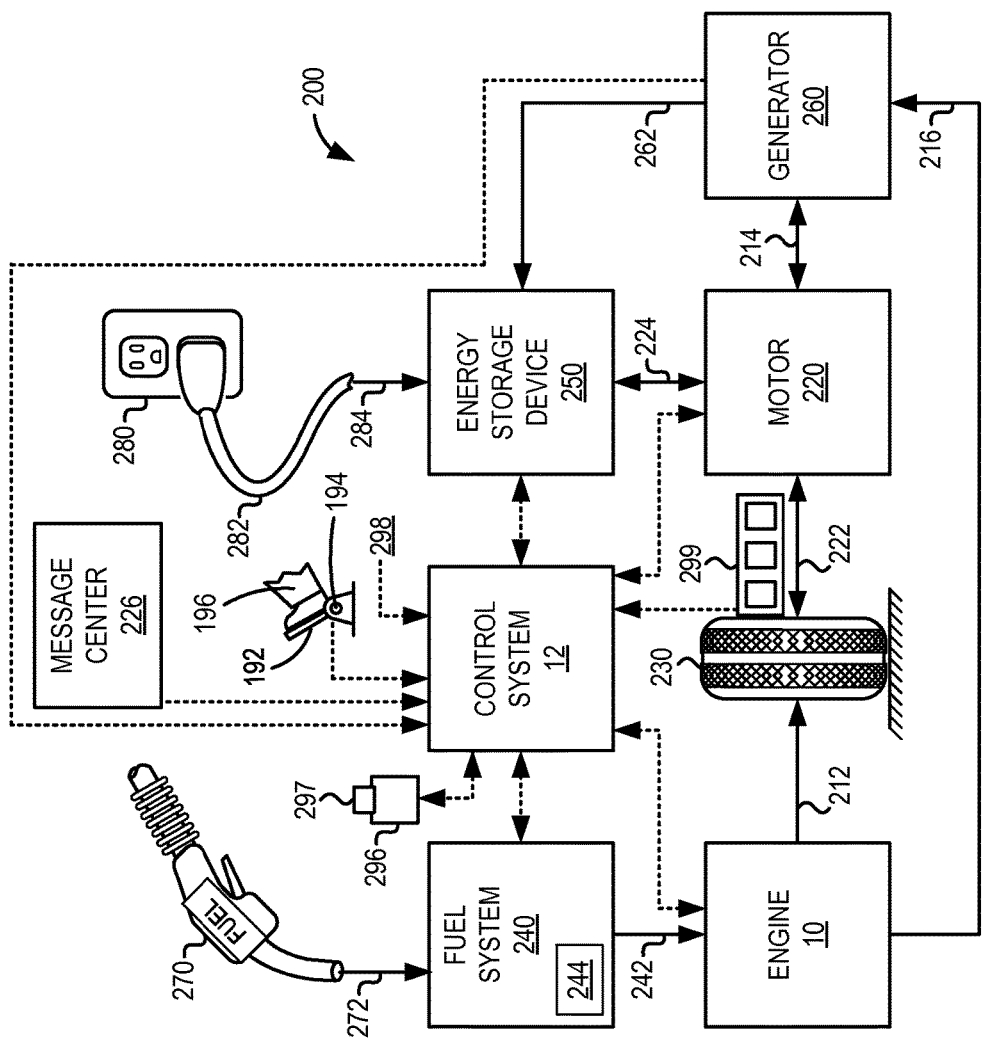
FIG. 2 depicts an example hybrid vehicle system layout.

FIG. 2 illustrates an example vehicle propulsion system 200. Vehicle propulsion system 200 includes a fuel burning engine 10 and a motor 220. As a non-limiting example, engine 10 may comprise an internal combustion engine and motor 220 may comprise an electric motor. Engine 10 of vehicle propulsion system 200 may be engine 10 depicted in the embodiment of FIG. 1A or engine 10 in the embodiment of FIG. 1B. Motor 220 may be configured to utilize or consume a different energy source than engine 10. For example, engine 10 may consume a liquid fuel (e.g. gasoline) to produce an engine output while motor 220 may consume electrical energy to produce a motor output. As such, a vehicle with vehicle propulsion system 200 may be referred to as a hybrid electric vehicle (HEV).

Vehicle propulsion system 200 may utilize a variety of different operational modes depending on operating conditions encountered by the vehicle propulsion system. Some of these modes may enable engine 10 to be maintained in an "OFF" state (i.e. set to a deactivated state with engine at rest) where combustion of fuel at the engine is discontinued. For example, under select operating conditions, motor 220 may propel the vehicle via drive wheel 230 as indicated by arrow 222 while engine 10 is deactivated.

During other operating conditions, engine 10 may be set to a deactivated state (as described above) while motor 220 may be operated to charge energy storage device 250. For example, motor 220 may receive wheel torque from drive wheel 230 as indicated by arrow 222 where the motor may convert the kinetic energy of the vehicle to electrical energy for storage at energy storage device 250 as indicated by arrow 224. This operation may be referred to as regenerative braking of the vehicle. Thus, motor 220 can provide a generator function in some embodiments. However, in other embodiments, generator 260 may instead receive wheel torque from drive wheel 230, where the generator may convert the kinetic energy of the vehicle to electrical energy for storage at energy storage device 250 as indicated by arrow 262.

During still other operating conditions, engine 10 may be operated by combusting fuel received from fuel system 240 as indicated by arrow 242. For example, engine 10 may be operated to propel the vehicle via drive wheel 230 as indicated by arrow 212 while motor 220 is deactivated. During other operating conditions, both engine 10 and motor 220 may each be operated to propel the vehicle via drive wheel 230 as indicated by arrows 212 and 222, respectively. A configuration where both the engine and the motor may selectively propel the vehicle may be referred to as a parallel type vehicle propulsion system. Note that in some embodiments, motor 220 may propel the vehicle via a first set of drive wheels and engine 10 may propel the vehicle via a second set of drive wheels.

In other embodiments, vehicle propulsion system 200 may be configured as a series type vehicle propulsion system, whereby the engine does not directly propel the drive wheels. Rather, engine 10 may be operated to power motor 220, which may in turn propel the vehicle via drive wheel 230 as indicated by arrow 222. For example, during select operating conditions, engine 10 may drive generator 260, which may in turn supply electrical energy to one or more of motor 220 as indicated by arrow 214 or energy storage device 250 as indicated by arrow 262. As another example, engine 10 may be operated to drive motor 220 which may in turn provide a generator function to convert the engine output to electrical energy, where the electrical energy may be stored at energy storage device 250 for later use by the motor.

Fuel system 240 may include one or more fuel tanks 244 for storing fuel on-board the vehicle. For example, fuel tank 244 may store one or more liquid fuels, including but not limited to: gasoline, diesel, and alcohol fuels. In some examples, the fuel may be stored on-board the vehicle as a blend of two or more different fuels. For example, fuel tank 244 may be configured to store a blend of gasoline and ethanol (e.g. E10, E85, etc.) or a blend of gasoline and methanol (e.g. M10, M85, etc.), whereby these fuels or fuel blends may be delivered to engine 10 as indicated by arrow 242. Thus, liquid fuel may be supplied from fuel tank 244 to engine 10 of the motor vehicle shown in FIG. 2. Still other suitable fuels or fuel blends may be supplied to engine 10, where they may be combusted at the engine to produce an engine output. The engine output may be utilized to propel the vehicle as indicated by arrow 212 or to recharge energy storage device 250 via motor 220 or generator 260.

In some embodiments, energy storage device 250 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 250 may include one or more batteries and/or capacitors.

Control system 12 (also termed herein, controller 12) may communicate with one or more of engine 10, motor 220, fuel system 240, energy storage device 250, and generator 260. As will be described by the process flow of FIG. 5, control system 12 may receive sensory feedback information from one or more of engine 10, motor 220, fuel system 240, energy storage device 250, and generator 260. Further, control system 12 may send control signals to one or more of engine 10, motor 220, fuel system 240, energy storage device 250, and generator 260 responsive to this sensory feedback. Control system 12 may receive an indication of an operator requested output of the vehicle propulsion system from a vehicle operator 196. For example, control system 12 may receive sensory feedback from pedal position sensor 194 which communicates with pedal 192. Pedal 192 may refer schematically to a brake pedal and/or an accelerator pedal.

Energy storage device 250 may periodically receive electrical energy from a power source 280 residing external to the vehicle (e.g. not part of the vehicle) as indicated by arrow 284. As a non-limiting example, vehicle propulsion system 200 may be configured as a plug-in hybrid electric vehicle (HEV), whereby electrical energy may be supplied to energy storage device 250 from power source 280 via an electrical energy transmission cable 282. During a recharging operation of energy storage device 250 from power source 280, electrical transmission cable 282 may electrically couple energy storage device 250 and power source 280. While the vehicle propulsion system is operated to propel the vehicle, electrical transmission cable 282 may disconnected between power source 280 and energy storage device 250. Control system 12 may identify and/or control the amount of electrical energy stored at the energy storage device, which may be referred to as the state of charge (SOC). Energy storage device 250 may also be termed a battery.

In other embodiments, electrical transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it should be appreciated that any suitable approach may be used for recharging energy storage device 250 from a power source that does not comprise part of the vehicle. In this way, motor 220 may propel the vehicle by utilizing an energy source other than the fuel utilized by engine 10.

Fuel system 240 may periodically receive fuel from a fuel source residing external to the vehicle. As a non-limiting example, vehicle propulsion system 200 may be refueled by receiving fuel via a fuel dispensing device 270 as indicated by arrow 272. In some embodiments, fuel tank 244 may be configured to store the fuel received from fuel dispensing device 270 until it is supplied to engine 10 for combustion. In some embodiments, control system 12 may receive an indication of the level of fuel stored at fuel tank 244 via a fuel level sensor. The level of fuel stored at fuel tank 244 (e.g. as identified by the fuel level sensor) may be communicated to the vehicle operator, for example, via a fuel gauge or indication in a vehicle instrument panel 296.

The vehicle propulsion system 200 may also include an ambient temperature/humidity sensor 298, and a roll stability control sensor, such as a lateral and/or longitudinal and/or yaw rate sensor(s) 299. The vehicle instrument panel 296 may include indicator light(s) and/or a text-based display in which messages are displayed to an operator. The vehicle instrument panel 296 may also include various input portions for receiving an operator input, such as buttons, touch screens, voice input/recognition, etc. For example, the vehicle instrument panel 296 may include a refueling button 297 which may be manually actuated or pressed by a vehicle operator to initiate refueling. For example, as described in more detail below, in response to the vehicle operator actuating refueling button 297, a fuel tank in the vehicle may be depressurized so that refueling may be performed.

In an alternative embodiment, the vehicle instrument panel 296 may communicate audio messages to the operator without display. Further, the sensor(s) 299 may include a vertical accelerometer to indicate road roughness. These devices may be connected to control system 12. In one example, the control system may adjust engine output and/or the wheel brakes to increase vehicle stability in response to sensor(s) 299.

Figure 3:
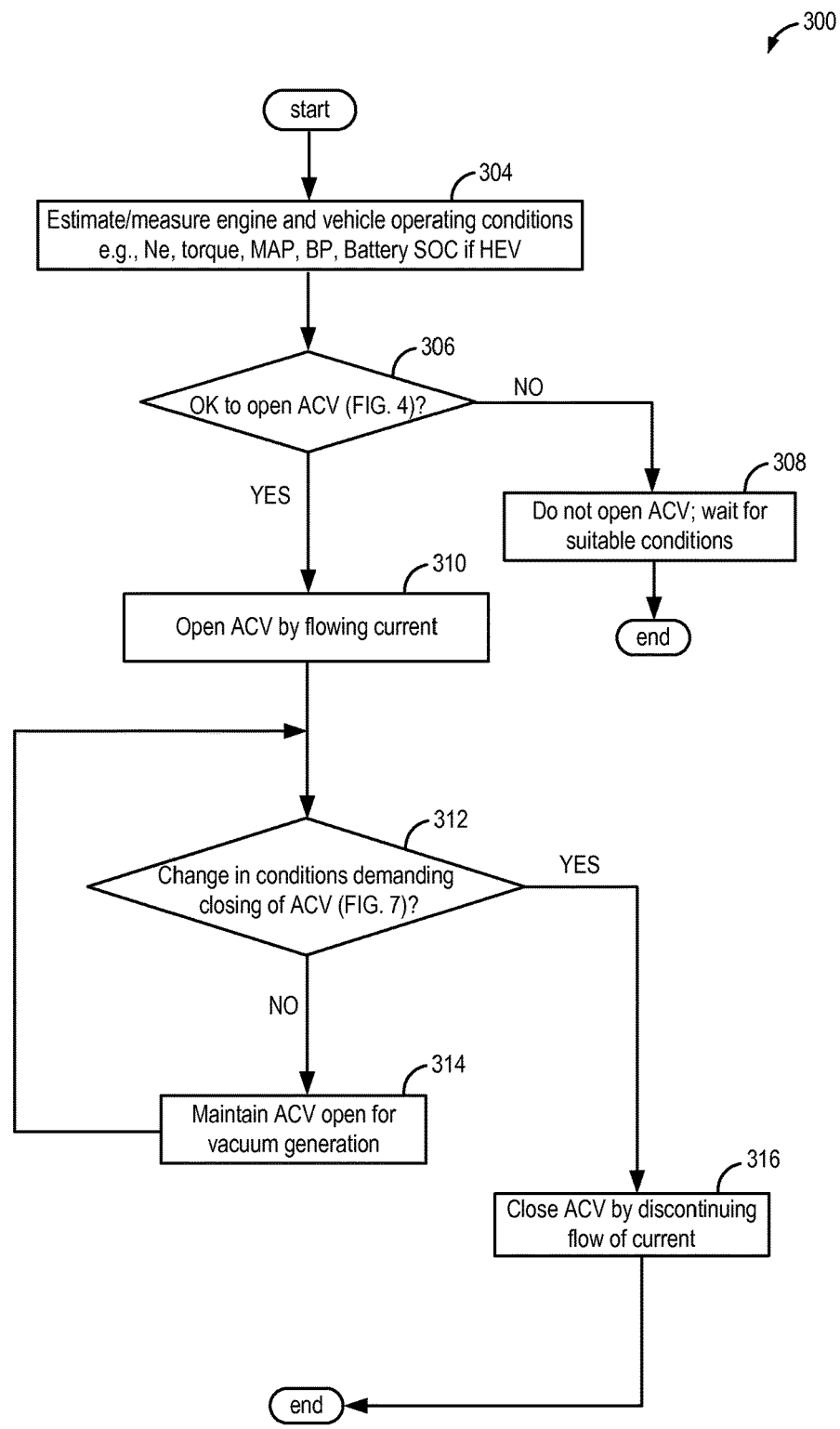
FIG. 3 presents a high level flow chart illustrating a routine for controlling the operation of an aspirator shut-off valve (ASOV) included in the engine system of FIGS. 1A and 1B, according to the present disclosure.

Now turning to FIG. 3, an example routine 300 is shown for operating an aspirator control valve (ACV) coupled to an intake bypass passage either upstream of or downstream of (or integral to) an aspirator, such as in FIG. 1A. Routine 300 may also be utilized for controlling an ACV coupled to a compressor bypass passage in a boosted engine, such as engine 11 of FIG. 1B. The routine enables motive flow through the aspirator to be adjusted by modulating an opening of the ACV based on engine conditions.

At 304, the routine includes estimating and/or measuring engine and/or vehicle operating conditions. These include, for example, engine speed, engine temperature, atmospheric conditions (temperature, BP, humidity, etc.), MAP, boost pressure (in a boosted engine), desired torque, EGR, battery state of charge (SOC), etc.

At 306, routine 300 may determine if engine conditions permit opening the ACV (from a closed position). Specifically, an opening of the ACV may be increased to enable vacuum generation if suitable engine conditions are present.

In the example of the ACV being a binary valve (e.g. two-way valve), the routine may determine if the ACV may be adjusted to a fully open position from a fully closed position. If the ACV is a continuously variable valve, the routine may determine if the ACV can be modulated from the fully closed position to a position between fully closed and fully open. In one example, a suitable engine condition for opening the ACV may be an engine speed higher than a transmission lugging limit. In another example, a suitable engine condition may include MAP lower than throttle inlet pressure (TIP). As described earlier, ACV control may not depend on a level of stored vacuum in a vacuum reservoir. The controller may activate routine 400 of FIG. 4 to determine if conditions are suitable for opening the ACV at 306. If it is determined that suitable conditions do not exist for opening the ACV, routine 300 progresses to 308 to wait for appropriate engine conditions and the ACV may not be opened. In one example, a previous position of the ACV may be maintained or the ACV may be adjusted to a more closed position based on existing engine conditions.

However, if it is determined that the ACV can be opened, routine 300 continues to 310 where the ACV is opened for vacuum generation. For example, the opening of the ACV may be increased to enable a higher motive flow through the aspirator. As such, the ACV may be a solenoid-controlled valve. Actuating the ACV to an open position may comprise flowing a current to energize the solenoid. Further, the controller may actuate the ASOV solenoid in an opening direction. Opening the valve may include fully opening the valve or moving the valve to a more open position from a closed position (e.g. from fully closed). It will be noted that in the described example, a default position of the ACV may be a closed position when there is no flow of current to the solenoid. In other examples, the ACV may be a continuously variable valve where a degree of opening of the ACV may be adjusted between a fully open, a fully closed position, and any position therebetween). As a result of the increased motive flow through the aspirator due to the opening of the ACV, a larger amount of vacuum may be drawn at the aspirator.

At 312, routine 300 may determine if a change in engine conditions has occurred that may entail closing the ACV. For example, the engine speed may be lower than the transmission lugging limit. In another example, the MAP may be higher than the TIP in the example of a boosted engine. The controller may activate routine 700 of FIG. 7 at 312 to determine if engine conditions have changed sufficiently to close the ACV.

If it is determined that engine conditions have not changed, routine 300 proceeds to 314 to maintain the ACV in its open position (with the increased opening of the ACV at 310) for continued vacuum generation. Routine 300 may then return to 312 to monitor any change in engine conditions which may involve closing the ACV.

Alternatively, if it is determined at 312 that a change in engine conditions has resulted in a demand for closing the ACV, routine 300 continues to 316 to close the ACV e.g. by discontinuing the flow of current. For example, the ACV may be adjusted to the fully closed position from the fully open position. In another example, the ACV may be moved to a mostly closed position from a mostly open position. In the example of the solenoid ACV, current flow to the solenoids may be ceased causing a closure of the ACV impeding motive flow through the aspirator. Routine 300 then ends.

Figure 4:
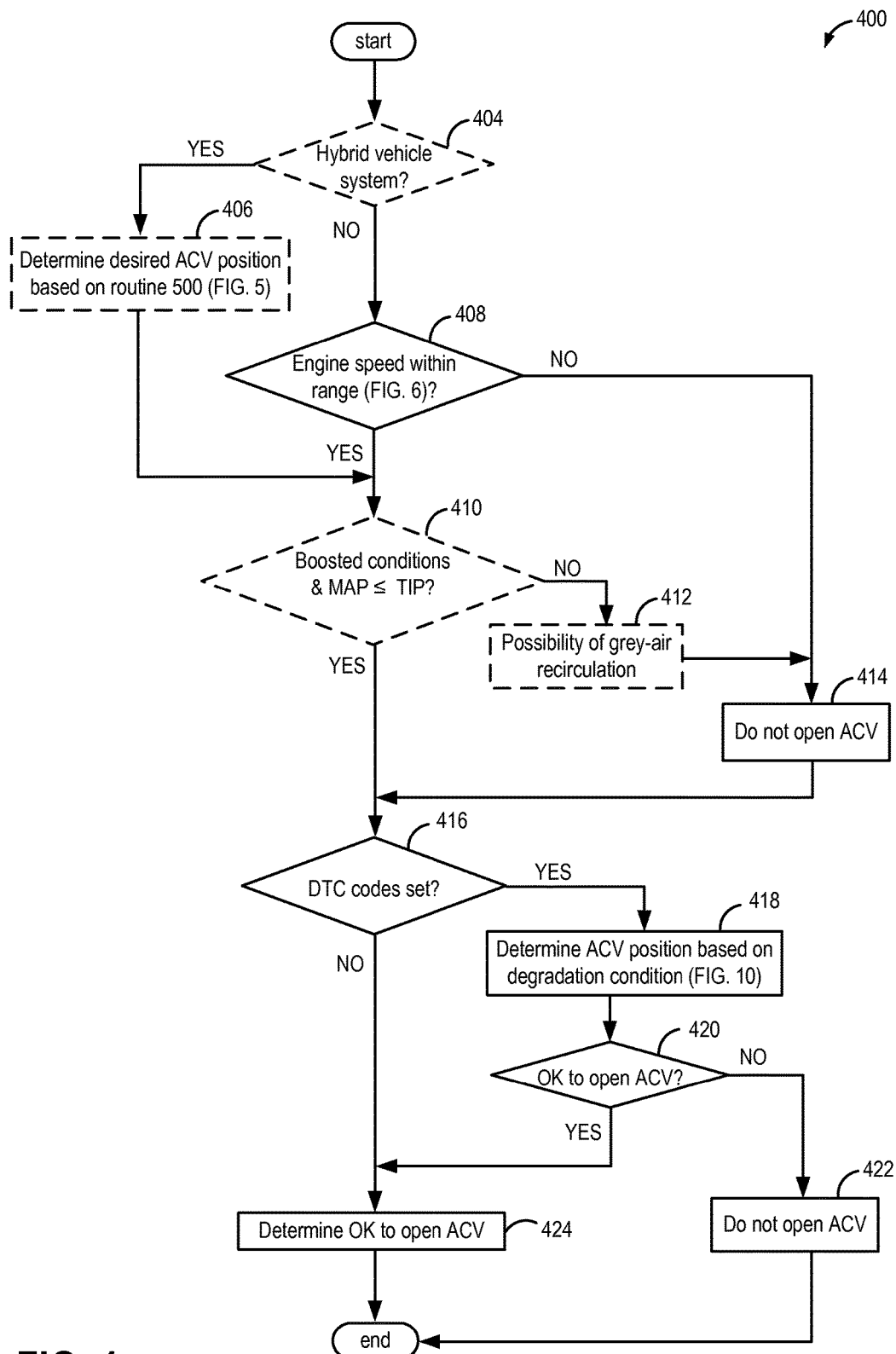
FIG. 4 portrays an example flow chart illustrating a routine for determining if conditions are suitable for opening the ASOV.
Figure 5:
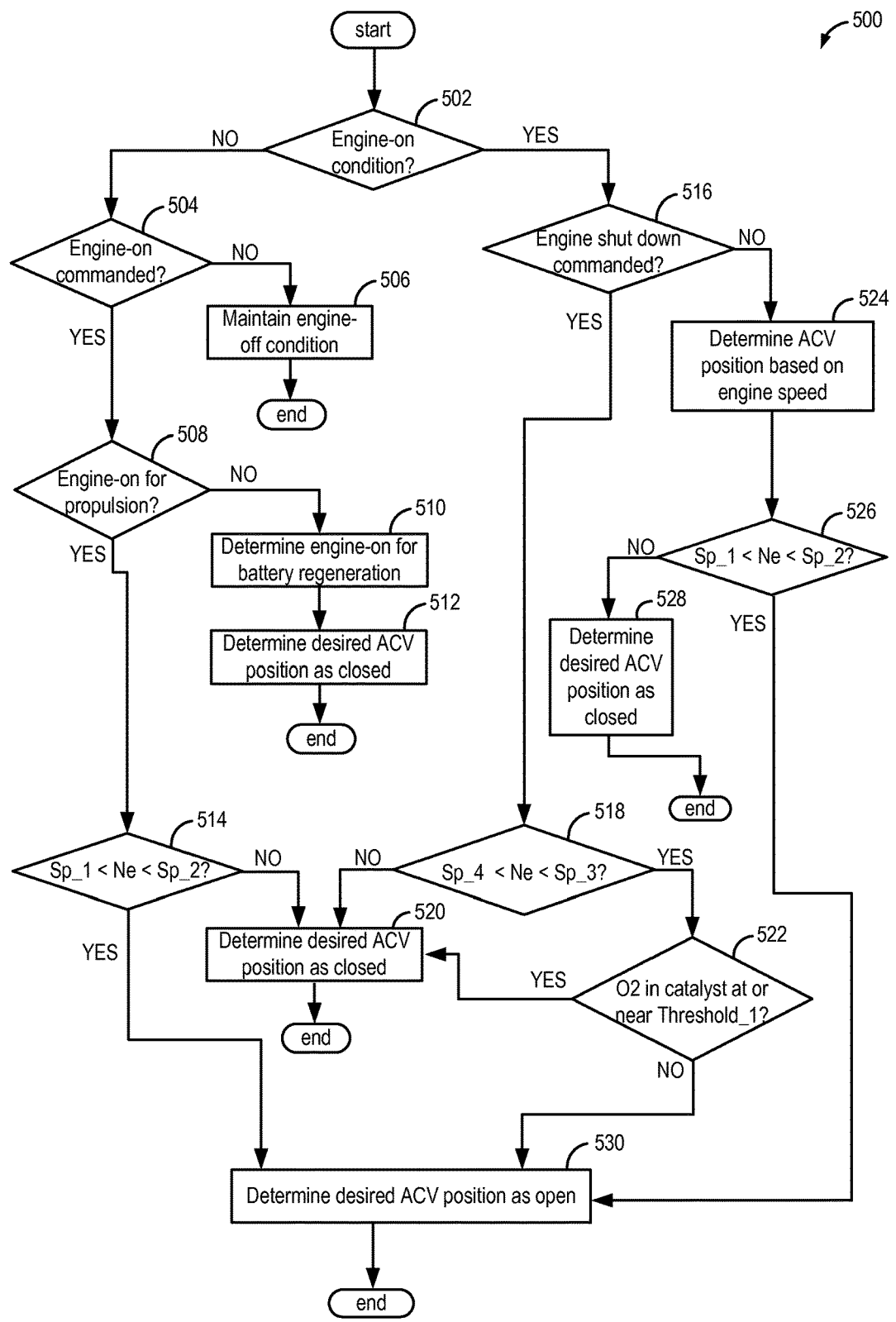
FIG. 5 shows an example flow chart illustrating a routine for determining a position of the ASOV in a hybrid electric vehicle (HEV) system, in accordance with the present disclosure.

Turning now to FIG. 4, it presents routine 400 for determining if suitable engine conditions are prevalent for opening the ACV. As mentioned earlier, the controller may activate routine 400 at 306 of routine 300 in FIG. 3. Specifically, routine 400 assesses engine speed, manifold pressure (in a boosted engine), degradation conditions, etc. to determine a position of the ACV.

At 404, it may be determined if the vehicle system is a hybrid vehicle. If yes, routine 400 proceeds to 406 where the ACV position is determined based on routine 500 of FIG. 5. Specifically, the ACV position may be modulated in a distinct manner in a hybrid vehicle system based on engine-on conditions and engine shutdown conditions. For example, an engine shutdown opportunity may be used to generate additional vacuum before the engine comes to rest. Routine 400 may then continue to 410.

If it is determined at 404 that the vehicle system is not a hybrid vehicle, routine 400 proceeds to 408 to determine if the engine speed is within a desired range. Routine 600 of FIG. 6 may be activated for determining if the speed of rotation of the engine is between a first, lower speed and a second, higher speed.

Figure 6:
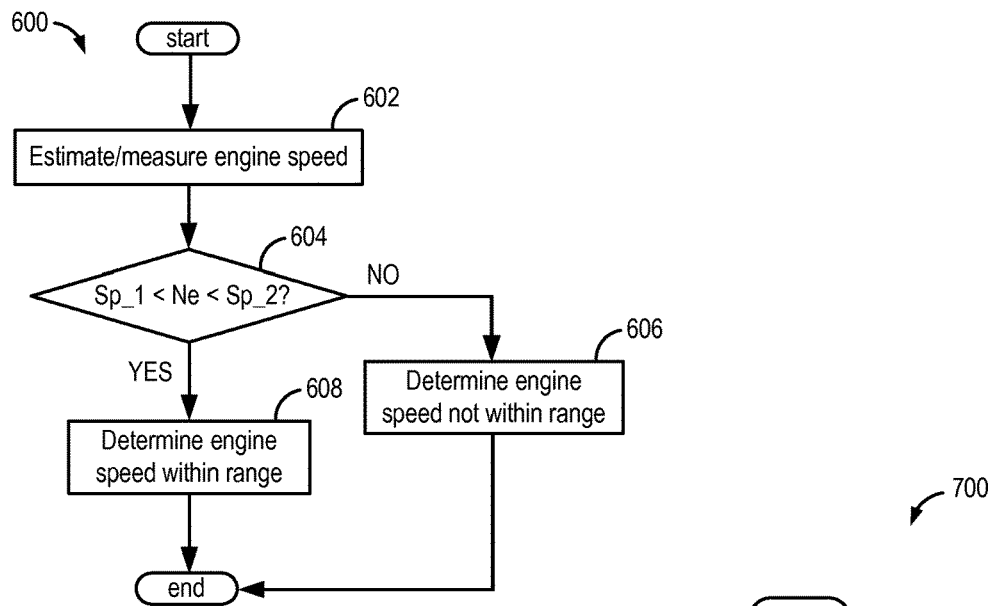
FIG. 6 depicts an example flow chart illustrating a routine for establishing if engine speed is within a desired range for opening the ASOV.
Figure 7:
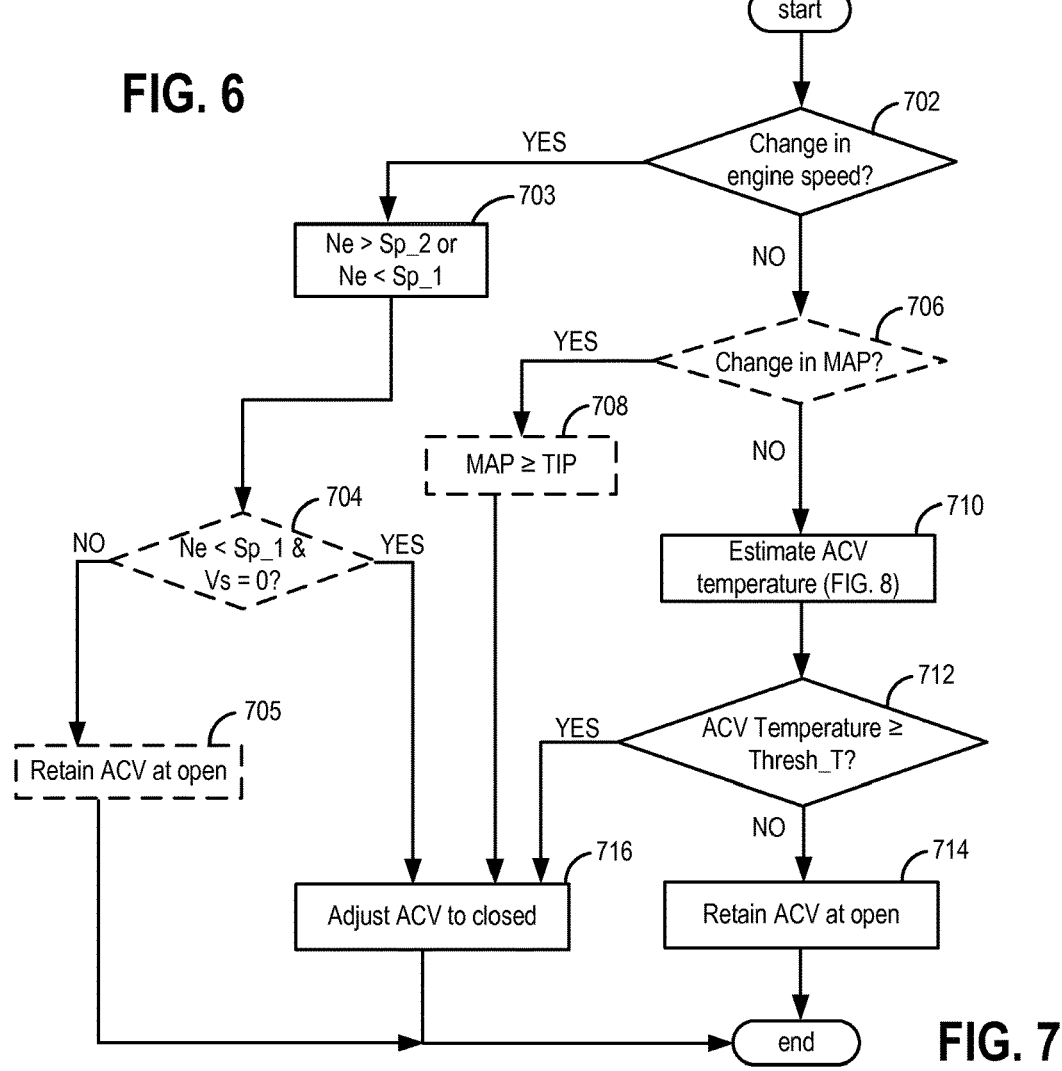
FIG. 7 presents an example flow chart illustrating a routine for verifying if a change in engine conditions has occurred to modify the position of the ASOV.

Referring now to FIG. 6, routine 600 is depicted herein for measuring engine speed and determining if engine speed is within a suitable range allowing the ACV to be opened. At 602, routine 600 may estimate or measure engine speed. As such, engine speed may be measured based on a profile ignition pickup signal (PIP) from a Hall effect sensor (e.g. Hall effect sensor 118 of engine 10 and engine 11) coupled to a crankshaft. Hall effect sensor 118 may produce a predetermined number of equally spaced pulses every revolution of the crankshaft from which engine speed (RPM) can be determined.

Next at 604, routine 600 may determine if the measured or estimated engine speed falls in a desired range between a first, lower speed, $Sp\_1$ and a second, higher speed, $Sp\_2$. For example, the first, lower speed, $Sp\_1$ may be based on a transmission lugging limit. The transmission lugging limit may be a speed below which the engine may experience lugging. As such, the transmission lugging limit may be a minimum speed that reduces vibrations in a driveline. Noise and vibrations may be produced in the transmission when the engine speed is significantly lower for a given engine load. In one example, the transmission lugging limit (and $Sp\_1$) may be 1250 RPM. In another example, the transmission lugging limit (and $Sp\_1$) may be 1500 RPM. The second, higher speed, $Sp\_2$ may be based on a redline speed. Redline speed refers to a pre-determined maximum limit on engine speed for a given engine wherein operating the given engine at a speed higher than redline may cause significant engine component degradation. In one example, redline speed (and $Sp\_2$) may be 6000 RPM. In another example, redline speed (and $Sp\_2$) may be 7000 RPM.

If it is confirmed at 604 that the estimated or measured engine speed is between $Sp\_1$ and $Sp\_2$, routine 600 continues to 608 to determine that engine speed is within the desired range. Herein, the ACV may be opened (or the opening of the ACV may be increased) if other engine conditions that conflict with opening the ACV are absent. However, if it is determined that engine speed is either lower than $Sp\_1$ or higher than $Sp\_2$, routine 600 proceeds to 606 to determine that engine speed is not within the desired range. As such, the ACV may not be opened (and may be closed, if open) if engine speed is either lower than $Sp\_1$ or higher than $Sp\_2$. Routine 600 may then end. Thus, routine 600 may determine if engine speed is within the desired range and the result may be used by routine 400 of FIG. 4.

Returning to 408 in routine 400, if it is determined that the engine is not within the desired range, routine 400 continues to 414 where the ACV may not be opened and may be retained at a closed position (or may be closed, if open). Thus, the ACV may not be adjusted to an open position and may be fully closed. In other words, the opening of the ACV may not be increased. Routine 400 may then proceed to 416.

However, if it is determined at 408 that engine speed is within the desired range, routine 400 continues to optional step 410 in a boosted engine where it may confirm that boosted conditions exist in the engine along with manifold absolute pressure (MAP) being lower than or equal to the TIP. Manifold pressure may be estimated by manifold pressure sensor (such as pressure sensor 122 of FIGS. 1A and 1B) while throttle inlet pressure (or boost chamber pressure) may be determined by a throttle inlet pressure sensor such as TIP sensor 123 of FIG. 1B. If MAP is determined to be higher than TIP (e.g. when engine exits boosted conditions when TIP=barometric pressure), routine 400 progresses to 412 where it may determine a possibility of grey air recirculation and proceed to 414 to not open the ACV, and maintain the ACV at a closed position. Barometric pressure (BP), if desired, may be measured by combination temperature/pressure sensor such as sensor 121 of FIG. 1B.

Grey air may be present in the intake manifold in the form of purged fuel vapors from a fuel vapor canister (such as from purge conduit 76 in FIGS. 1A and 1B), mixture of air and fuel vapors received from a positive crankcase ventilation (PCV) system (such as via PCV conduit 78 in FIGS. 1A and 1B), exhaust backwash from an overlap between exhaust valves and intake valves, and/or exhaust gases received from an exhaust gas recirculation (EGR) system such as those shown in FIGS. 1A and 1B. This mixture of air, exhaust gases, and fuel vapors may include constituents that accumulate as semi-polymerized deposits when present in cooler locations of the engine intake. For example, semi-polymerized deposits may build up in an air cleaner in the intake passage since the air cleaner may be cooler. When manifold pressure is higher than TIP in a boosted engine and the ACV is open (or the opening of the ACV is increased), the mixture of air, fuel vapors, and exhaust gases within the intake manifold may flow through the aspirator in the compressor bypass passage (such as conduit 28 of FIG. 1B) towards the air cleaner (such as air cleaner 133 in FIGS. 1A and 1B) in the intake passage. Accordingly, in order to reduce formation of residues from grey air recirculation via the compressor bypass passage, the ACV may be closed when MAP is measured to be higher than TIP.

If, however, it is determined that either boosted conditions are not present or that MAP is either equivalent to or lower than TIP, routine 400 proceeds to 416.

It will be noted that if the engine is not a forced induction engine (e.g. such as a naturally aspirated engine), routine 400 may skip 410 and proceed from 408 directly to 416 (or via 410).

At 416, routine 400 may confirm if a diagnostic trouble code (DTC) has been set. A DTC may be set in the controller upon identification of degradation of one or more components within the engine. In some embodiments, a malfunction indicator lamp (MIL) may be activated upon identification of degradation to alert a vehicle operator. Further, based on the identified degradation, the controller may modify one or more engine parameters to enable continued reliable engine operation. As such, the controller may enable engine operation even though one or more components may be degraded while signaling the vehicle operator to address the issue.

Engine operation responsive to diagnosis of engine degradation may be termed as modified engine operation. Modified engine operation may include operating the engine with altered engine parameters such as increased or decreased EGR flow, modified spark timing, revised fuel injection, etc. Further, modifications to engine operating parameters may be based on the identified degradation. As an example, the ACV position may be dependent on the diagnosed degradation condition. A first degradation condition may desire a closed ACV while a second degradation condition may require the ACV to be held open. In another example, if an exhaust sensor is determined to be degraded, fuel injection timing and/or amount may be modified.

Thus, if at 416, routine 400 confirms that a degradation condition has been detected, routine 1000 of FIGS. 10A and 10B may be activated at 418 to determine a suitable position of the ACV. The position of the ACV may be based, as mentioned above, on the type of degradation as well as resulting modified engine operation. Next, at 420, based on routine 1000, it may be determined if the modified engine operation in response to the detected degradation condition allows opening of the ACV. If not, routine 400 proceeds to 422 where the ACV may be closed or retained at a closed position (e.g. ACV may not be opened). Alternatively, if it is confirmed at 420 that opening the ACV is desirable in the modified engine operation, routine 400 continues to 424 to determine that the ACV may be adjusted to an open position. The open position may include one of a fully open position or a position between fully open and fully closed. Routine 400 may then end.

Thus, a controller may adjust a position of the aspirator shut-off valve (ASOV) based on engine speed. As such, a first initial position of the ASOV may be determined by an existing, measured engine speed. For example, the first initial position of the ASOV based solely on engine speed may be the open (or mostly open, partly open) position when the existing engine speed is higher than a first speed (Sp_1) and lower than a second speed (Sp_2). By maintaining the ASOV in the open position, considerable motive flow may be enabled through the aspirator. Alternatively, the first initial position of the ASOV may be a closed position when the existing engine speed is either lower than the first speed or higher than the second speed. The first, initial position may, however, be altered if MAP is estimated to be higher than TIP in a boosted engine. In the example of the first initial position of the ASOV being the open position, the ASOV may be adjusted to the closed position (e.g. fully closed) if MAP is measured to be higher than TIP to reduce grey air recirculation and formation of deposits in the air cleaner and/or other intake passage components. Further, the first, initial position of the ACV may be modified based on engine degradation conditions and the resulting modified engine operation. As such, the adjusted ACV position in response to the possibility of grey air recirculation may also be altered if modified engine operation in response to engine degradation requires a different ACV position. Thus, the first initial position of the ACV may be overridden by other engine conditions.

Turning now to FIG. 5, it shows routine 500 for determining a position of the ACV in a hybrid vehicle system. Specifically, the ACV position may be adjusted based on engine speed when the engine is activated for propulsion, and if engine speed is within the desired range as described in FIG. 6. The ACV may also be opened for vacuum generation when engine shutdown is commanded and the engine speed falls within a lower desired range. Further still, the ACV may be opened or closed based on an oxygen content of a catalyst during engine shutdown.

At 502, it may be determined if the hybrid vehicle is operating in an engine-on condition. Herein, the engine may be fueled and may be combusting to propel the hybrid vehicle. Alternatively, the engine may be combusting to recharge a battery in the hybrid vehicle. If it is determined that the engine is not operational but is shut down and at rest, routine 500 proceeds to 504 to confirm if an engine-on condition has been commanded. The engine may be at rest, and may not be combusting, when the hybrid vehicle is primarily propelled by a motor. As an example, the motor may be the chief force propelling the hybrid vehicle during city driving or at lower vehicle speeds. Herein, the engine may be activated for combusting and propelling the hybrid vehicle when an increase in torque demand is received.

If an engine-on command has not been issued, routine 500 continues to 506 to maintain the engine-off condition, and ends. On the other hand, if the engine has been activated for operation, routine 500 proceeds to 508 to determine if the engine-on condition is for vehicle propulsion. For example, the engine may be activated to recharge the battery. In another example, the engine may have been activated in response to increased operator torque demand such as when accelerating. If it is determined at 508 that the engine has not been activated for vehicle propulsion, routine 500 progresses to 510 to determine that the engine is operating for battery recharging. Herein, the engine may be controlled to operate at idle speed (e.g. 900 RPM) while the battery is recharged. As such, the engine may not be propelling the hybrid vehicle. The air-fuel ratio may be controlled closely at low engine speeds (e.g. at idle) to reduce noise, vibration, and harshness (NVH) issues. As the engine may be operating at a lower speed during battery recharging, the ACV may be maintained at (or moved to) the closed position to reduce adverse effects on air-fuel ratio. Therefore, at 512, routine 500 may determine that the desired position for the ACV is the closed position. To elaborate, motive flow through the aspirator may complicate air-fuel ratio control during idle speeds and accordingly, the ACV may be closed to discontinue motive air flow through the aspirator. Routine 500 may then end.

If, however, it is determined at 508 that the engine has been activated for vehicle propulsion, routine 500 continues to 514 to determine if the existing engine speed is between a first, lower speed (Sp_1) and a second, higher speed (Sp_2). As described earlier in reference to routine 600, the first lower speed may be based on a transmission lugging limit of the engine. For example, the first, lower speed may be 1200 RPM. The second higher speed (Sp_2) may be based on the engine redline speed. An example second higher speed may be 5000 RPM for an example engine in a hybrid vehicle.

If the engine speed is determined to be between the first, lower speed and the second higher speed, routine 500 proceeds to 530 to determine that the desired position for the ACV is the open position. Herein, the open position may indicate a desired adjustment to the ACV resulting in increased motive flow through the aspirator. Thus, the open position may indicate increasing the opening of the ACV. If the engine speed is higher than the second higher speed (Sp_2) or the engine speed is lower than the first lower speed (Sp_1), routine 500 continues to 520 to determine that the desired position for the ACV is the closed position. Herein, motive air flow through the aspirator may not be desired and the opening of the ACV may be decreased as the ACV is adjusted to a closed position.

Returning to 502, if it is confirmed that the engine is on and operational, routine 500 proceeds to 516 to confirm if an engine shutdown has been commanded by the controller. For example, the engine may be operational and propelling the hybrid vehicle in a motor-off condition when cruising on a highway. Subsequently, when the hybrid vehicle exits the highway to drive on surface streets, an engine-off may be commanded while activating the motor for propelling the vehicle. In another example, the engine may be activated and operational for recharging the batteries. After the batteries are charged to a desired level, an engine shutdown may be commanded.

If at 516 it is confirmed that engine shut-down has been commanded, routine 500 moves to 518 to check if engine speed is between a third speed (Sp_3) and a fourth speed (Sp_4). Specifically, it may be confirmed if the engine speed is higher than the fourth speed as well as lower than the third speed. Herein, the third speed (Sp_3) may be lower than idle speed. For example, if idle speed is 900 RPM, the third speed may be 700 RPM. In another example, the third speed may be 500 RPM. The fourth speed (Sp_4) may be a speed occurring just prior to an imminent engine stop. For example, engine speed at engine stop may be 50 RPM. Herein, the fourth speed (Sp_4) may be 100 RPM. In another example, Sp_4 may be 200 RPM. In another example, the fourth speed may be based on reducing engine shutdown shake as the engine comes to rest. During engine shutdown, once combustion ceases in the cylinders of the engine, pistons may be compressing and expanding air that is trapped in engine cylinders. As such, excess air flow into the cylinders after fueling is terminated may result in trapped air within the cylinders. This compression and expansion of air may produce torsional pulses that may be transmitted to the vehicle body resulting in exacerbated NVH issues termed shutdown shake.

Accordingly, once engine shutdown is commanded and the engine is spinning down to rest with intake throttle closed, the ACV may be opened briefly for generating vacuum based on an engine speed range and based on engine shutdown shake. By closing the ACV prior to engine stop, excessive air flow to the cylinders may be decreased leading to a reduction in engine shut down shake.

If it is determined at 518 that the engine speed is higher than the fourth speed and is also lower than the third speed, routine 500 continues to 522 to determine if an oxygen content stored in an emission control device is at or near a threshold, Threshold_1. For example, the emission control device may be a three-way catalyst capable of storing oxygen. In particular, oxygen may be stored in the three-way catalyst during lean engine conditions. Lean engine conditions may occur during engine shut down when the engine is spinning without being fueled and when the ACV is opened for vacuum generation (when engine speed is between Sp_3 and Sp_4). Air flowing through the aspirator into the intake manifold, the cylinders, and eventually the emission control device may result in oxygen being stored in the three-way catalyst. Further, the three-way catalyst may get saturated with oxygen reducing its ability to treat emissions upon an engine restart.

Accordingly, if it is determined at 522 that a level of oxygen stored in the emission control device is at or near a threshold, Threshold_1 (e.g. threshold may be lower than saturation), routine 500 proceeds to 520 to determine that the desired position of the ACV is the closed position. Further, the ASOV may be closed synchronously with an intake throttle of the engine in the hybrid vehicle. Specifically, as the intake throttle is closed to reduce air flow through the intake passage following the engine shutdown command, the ACV may be closed concurrently.

On the other hand, if it is determined that the oxygen content in the emission control device is not at or near the threshold (e.g. considerably lower than the threshold), routine 500 continues to 530 to determine that the ACV may be opened. Thus, the ACV may be controlled independent of engine speed. To elaborate, the ACV may not be regulated based primarily on engine speed but may also be based on the oxygen storage content of the emission control device.

It will be appreciated that if the ACV is opened following engine shutdown (between third speed and fourth engine speed), oxygen content in the catalyst may increase in the duration of air flow through the aspirator. In response to this increase in stored oxygen content, the subsequent engine restart may include fueling the cylinders initially with a richer than stoichiometric air-fuel ratio.

Thus, vacuum may be generated in an engine in a hybrid vehicle via an aspirator during engine-on conditions when the engine is propelling the vehicle and the engine speed is higher than a first lower speed (e.g. idle speed or transmission lugging limit) and lower than a second higher speed (such as redline speed). Further, vacuum may also be generated at the aspirator when the engine is spinning down to rest and engine speed is lower than a third speed (e.g. lower than idle speed) and higher than a fourth speed (speed occurring just prior to an engine stop). However, the ACV may not be opened upon engine shutdown even though the engine speed is between the third speed and the fourth speed if a level of oxygen stored in the three-way catalyst is at or near a threshold level. Herein, the ACV position may follow that of the intake throttle. Specifically, the ACV may be adjusted to the fully closed position as the intake throttle is moved to its fully closed position upon engine shutdown.

It will be noted that a first engine speed may also be termed a first speed, a second engine speed may also be termed a second speed, a third engine speed may also be termed a third speed, and a fourth engine speed may also be termed a fourth speed.

Thus, an example hybrid vehicle system may include an engine, an intake manifold, an intake throttle coupled in an intake passage, a generator coupled to a battery, vehicle wheels propelled using torque from one or more of the engine and the generator, a boost device including a compressor, the compressor positioned in the intake passage upstream of the intake throttle, an ejector coupled in a compressor bypass passage, an ejector control valve (ECV), positioned upstream of the ejector in the compressor bypass passage, regulating motive flow through each of the ejector and the compressor bypass passage, a motive inlet of the ejector coupled to the intake passage downstream of the compressor, a motive outlet of the ejector coupled to the intake passage upstream of the compressor, and a controller with instructions in non-transitory memory and executable by a processor for, during a first condition, opening the ECV between a first engine speed and a second engine speed, the first engine speed being lower than the second engine speed, and during a second condition, opening the ECV between a third engine speed and a fourth engine speed, the fourth engine speed being nominally higher than that at engine rest, and during a third condition, closing the ECV independent of engine speed. Herein, the first condition may include an engine-on condition for propelling the hybrid vehicle system, the second condition may include an engine spinning down to rest, and the third condition may include an oxygen content of a catalyst at an oxygen content threshold. The controller may include further instructions for closing the ECV responsive to one of engine speed being lower than the first engine speed, engine speed being higher than the second engine speed, engine speed being higher than the third engine speed, and engine speed being lower than the fourth engine speed. The first engine speed may be based on a transmission lugging limit, the second engine speed may be based on a redline speed, and the third engine speed may be lower than an idle speed. The controller may include further instructions for closing the ECV in response to a pressure in the intake manifold being higher than a pressure at an inlet of the intake throttle.

Turning now to FIG. 7, it depicts routine 700 for determining if engine conditions have changed that may result in altering the position of the ACV. Specifically, routine 700 determines if there is a change in engine conditions (e.g. engine speed, manifold pressure, temperature of the ACV) that may result in closing the ACV.

At 702, routine 700 may confirm if the engine speed has changed. As described earlier in reference to routine 600 of FIG. 6, the ACV may be opened when engine speed is determined to be higher than the first, lower speed (Sp_1) and lower than the second higher speed (Sp_2). Therefore, it may be specifically determined at 702, if engine speed has reduced below the first, lower speed, Sp_1 or if engine speed has increased above the second, higher speed, Sp_2. If yes, routine 700 continues to 703 to determine that current engine speed is either lower than Sp_1 or higher than Sp_2.

An optional confirmation may be performed at 704 to determine if engine speed is lower than the first, lower speed and vehicle speed (Vs) is substantially zero. For example, the vehicle may be at rest (and Vs may be substantially zero) and idling. In another example, engine speed may be at idle even though the vehicle is moving. The optional confirmation at 704 may be done to ensure that sufficient vacuum is generated while the vehicle is moving. If the vehicle speed is higher than zero (e.g. vehicle is moving) and engine speed is lower than the first, lower speed (Sp_1), routine 700 may proceed to 705 to retain the ACV at its open position. However, if the vehicle speed is substantially zero and the engine speed is lower than the first, lower speed, routine 700 may continue to 716. In some embodiments, the controller may skip the optional confirmation at 704 and proceed directly to 716 from 703. Further, at 716, routine 700 may determine that a change in ACV position is desired. Specifically, the ACV may be adjusted to a closed position (from an open position) in response to the change in engine speed.

If it is determined at 702 that there is no change in engine speed, routine 700 proceeds to optional check at 706 for a boosted engine. If the engine is naturally aspirated, routine 700 may proceed directly to 710 from 702. Specifically, routine 700 may confirm if a change in MAP has occurred in the boosted engine at 706. As explained earlier in reference to 410 and 412 in routine 400, the ACV may be opened when MAP is lower than or equivalent to the TIP. If a change in MAP is confirmed at 706, routine 700 may then progress to 708 to determine that MAP is higher than TIP. For example, MAP may be higher than TIP when an engine is exiting boosted conditions and TIP is substantially equivalent to BP. When MAP is higher than TIP, grey air recirculation may occur. Accordingly, the ACV may be adjusted to the closed position at 716 to reduce grey air recirculation.

On the other hand, if no change in MAP is determined in a boosted engine, routine 700 continues to 710 where a temperature of the ACV may be estimated. The temperature of the ACV may be estimated based on a flow of current to the ACV. As explained earlier, the ACV may be an electro-mechanical solenoid valve which may be opened from a default closed position by the passage of current. The flow of current may heat the ACV resulting in component degradation. Accordingly, the temperature of the ACV may be monitored so that an increase in ACV temperature above a threshold temperature may result in a cessation of current flow to the ACV allowing a resting period for cooling the ACV. The estimation of ACV temperature will be described further in reference to FIG. 8 below.

Next, at 712, routine 700 determines if the temperature of the ACV is at or higher than a temperature threshold, Thresh_T. In one example, the temperature threshold, Thresh_T, may be 200° C. In another example, the temperature threshold, Thresh_T, may be 150° C. If it is determined that the temperature of the ACV is at or higher than the temperature threshold, routine 700 continues to 712 to close the ACV. Thus, current flow to the ACV may be terminated allowing the ACV to fully close. Conversely, if the temperature of the ACV is lower than the temperature threshold, Thresh_T, routine 700 progresses to 714 to maintain the ACV at its open position, and then ends.

Thus, an example engine system may comprise instructions in non-transitory memory and executable by a processor for adjusting an opening of the aspirator control valve (ACV) based on engine speed, and overriding the adjusting responsive to a change in engine conditions. The adjusting the opening of the ACV may include increasing the opening of the ACV in response to engine speed being higher than a first speed and lower than a second speed. Further, the change in engine conditions may include a change in engine speed, and wherein the overriding may include closing the ACV in response to the change in engine speed. The change in engine speed may include one of the engine speed decreasing below the first speed and engine speed increasing above the second speed. Another example of the change in engine conditions may include a change in intake manifold pressure, and wherein the overriding may include closing the ACV responsive to intake manifold pressure being higher than a throttle inlet pressure. Yet another example of the change in engine conditions may include a change in a temperature of the ACV, such as an increase in the temperature of the ACV. Herein, the overriding may include closing the ACV responsive to the temperature of the ACV exceeding a temperature threshold (e.g. Thresh_T of FIG. 7). The controller may include further instructions for closing the ACV in response to the engine speed decreasing below the first speed when the vehicle is at rest (e.g. when Vs=0). In other words, the controller may include instructions for not closing the ACV in response to the engine speed decreasing below the first lower speed (e.g. Sp_1) if the vehicle is moving.

Figure 8:
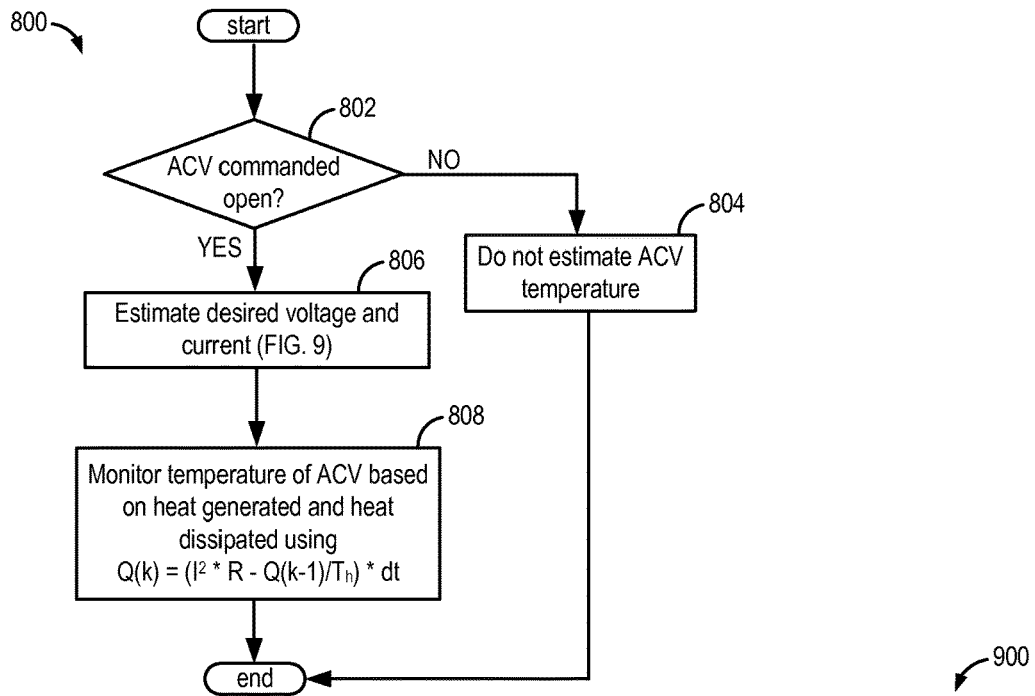
FIG. 8 shows an example flow chart illustrating a routine for monitoring a temperature of the ASOV.

Routine 800 of FIG. 8 illustrates a method for estimating the temperature of the ACV. Specifically, the temperature of the ACV is estimated based on an amount of current flow and a duration of current flow.

At 802, routine 800 may confirm that the ACV is commanded open. If not, routine 800 continues to 804 and the temperature of the ACV is not estimated. If yes, routine 800 progresses to 806 to estimate a desired voltage for a desired current flow to the ACV. The desired voltage and desired current flow to the ACV may be estimated by routine 900 of FIG. 9. Specifically, the desired voltage and the desired current flow may be based upon an estimated underhood soak temperature.

Figure 9:
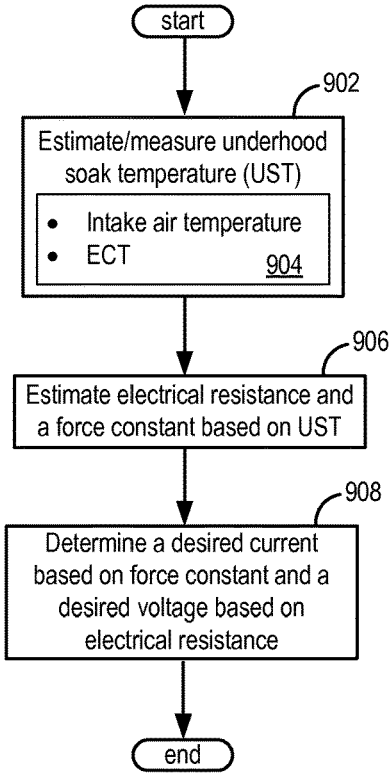
FIG. 9 depicts an example flow chart illustrating a routine for determining a desired current and voltage to be applied to the ASOV for actuation.
Figure 10A:
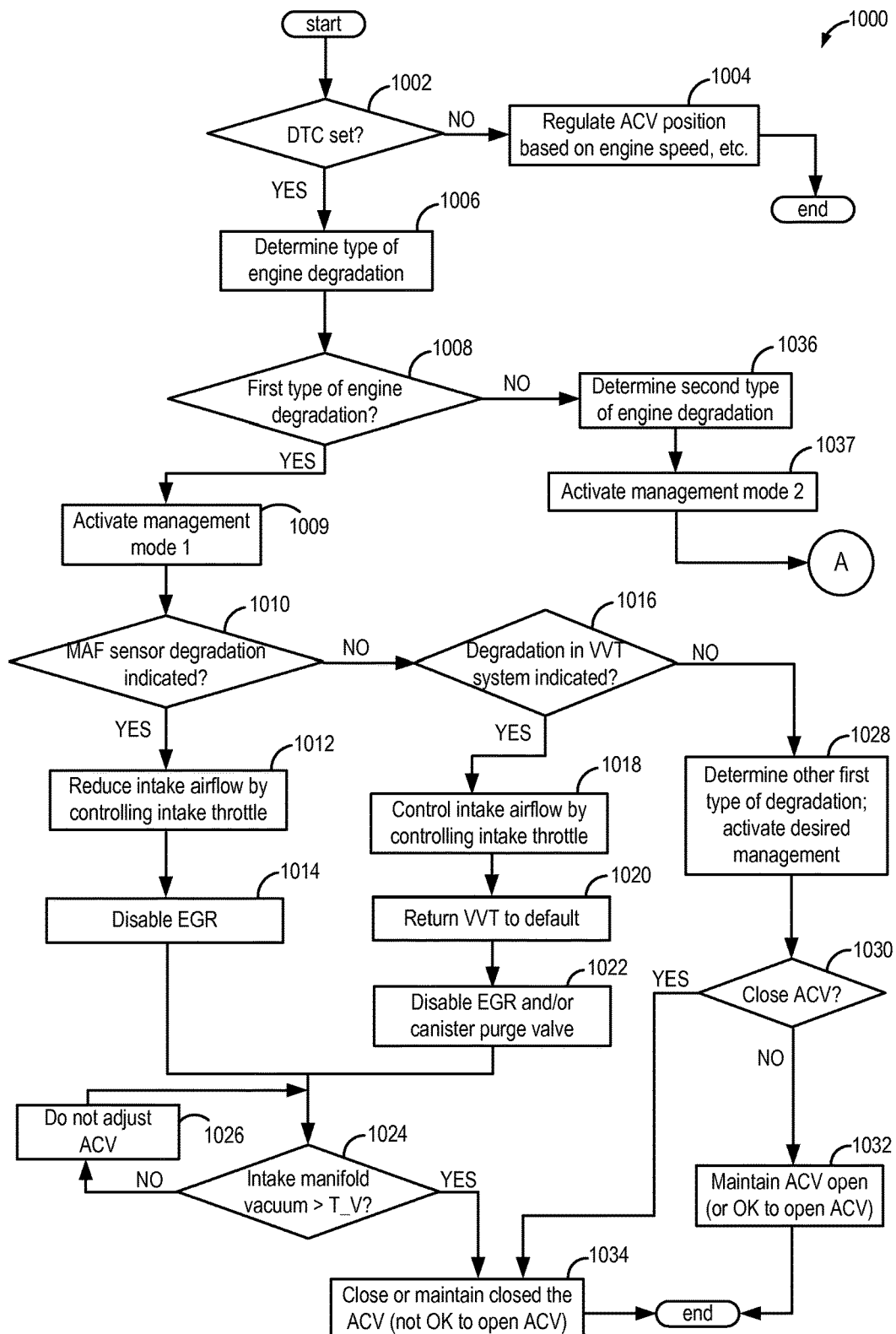
FIGS. 10A and 10B portray an example flow chart illustrating a routine for determining a position of the ASOV based on an existing engine degradation condition.
Figure 10B:
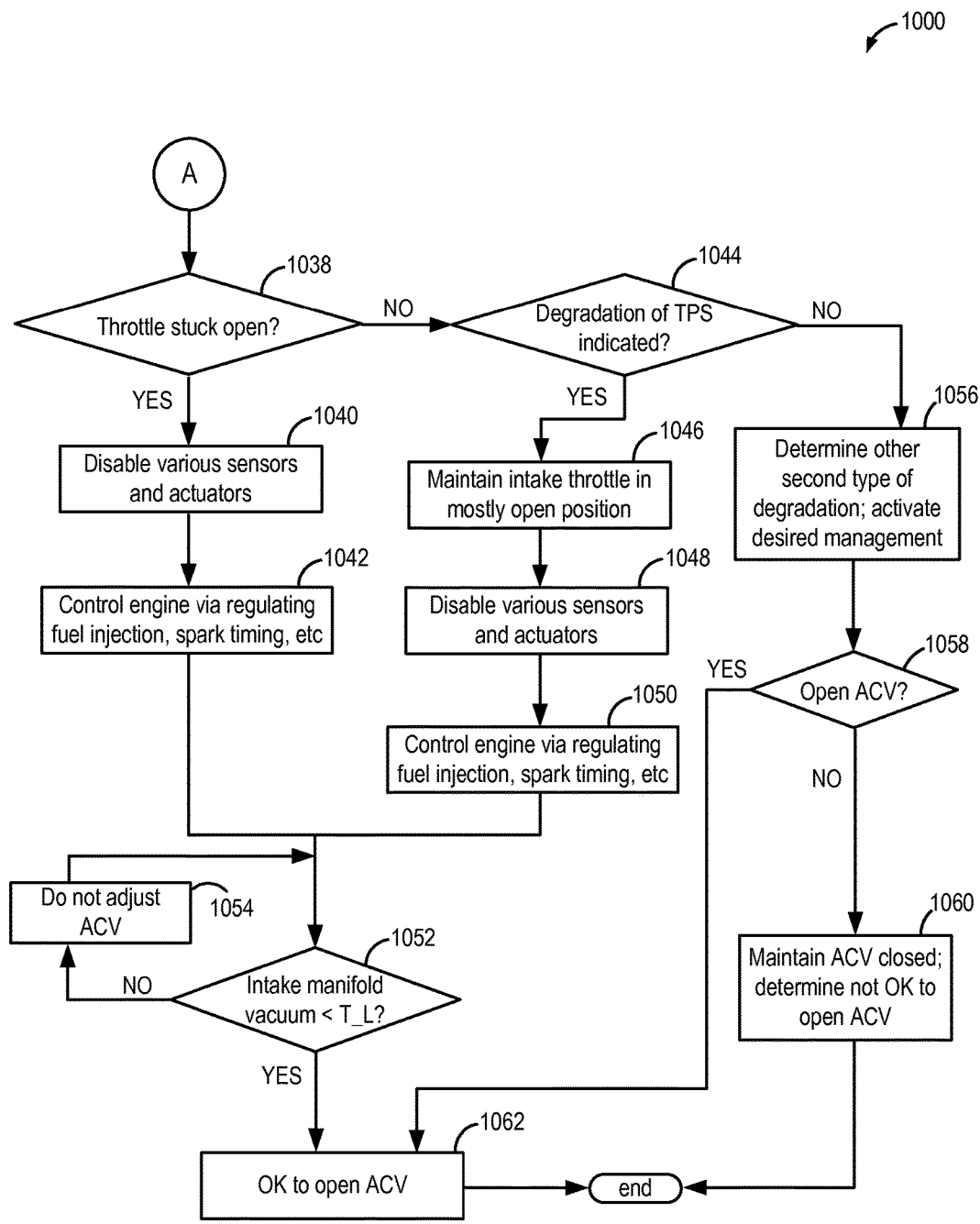

Referring to FIG. 9, routine 900 demonstrates an estimation of the desired voltage and current flow to activate the ACV (e.g. opening the ACV). At 902, an underhood soak temperature may be estimated. Underhood soak temperature may be a temperature of the air surrounding the engine under a hood of the vehicle. Underhood temperature (near the engine) may be inferred based on measurements of various sensors. At 904, routine 900 includes using an intake air temperature and an engine coolant temperature to estimate the underhood soak temperature. A measurement of intake air temperature may be obtained from a combination temperature/pressure sensor, such as sensor 121 of FIGS. 1A and 1B, while a measurement of engine coolant temperature may be received from an engine coolant temperature sensor, such as sensor 112 of FIGS. 1A and 1B. In one example, the intake air temperature measurement may be sufficient to estimate the underhood soak temperature. In another example, the measurements of the intake air temperature and the engine coolant temperature may be averaged with a weight function to determine the underhood soak temperature.

Next, at 906, an electrical resistance and a force constant may be estimated. As such, the underhood soak temperature estimated at 902 may be used as a reference temperature for estimating the electrical resistance and the force constant due to a magnet coil interaction in the solenoid of ACV. At 908, the desired current may be determined based on the force constant along with the desired voltage that may be learned from the estimated electrical resistance. The force constant estimated for the solenoid in the ACV may enable learning a minimum current flow needed to hold the valve open against a spring in the solenoid valve. Further, the electrical resistance along with the desired current enable a calculation of the desired voltage based on Ohm's law.

The ACV, in one example, may be implemented as a spring holding the valve in a first position with a solenoid opposing the spring force. Solenoids may produce a force that is directly proportional to an applied electrical current. Further, duty-cycled voltage output drivers may be used for cost reasons rather than current controlled output drivers. By forming an estimate of an electrical resistance of the solenoid, a duty-cycled voltage output may be employed to control applied current (since resistance is reasonably known). It is also well known in the art that resistance varies with temperature. Thus, by inferring temperature of the ACV, the solenoid resistance may be calculated and a desired duty-cycled voltage may be applied to open or maintain open the ACV. As such, by applying a smaller yet sufficient electrical energy, electrical power may be conserved and heating of the ACV may be diminished.

It will therefore be appreciated that if the ACV is actuated open using a calculation as the one in FIG. 9, the ACV may be actuated in a more efficient manner with a lower power consumption. Further, the temperature of the ACV may not rise significantly enabling a reduction in resting periods when the ACV is deactivated (and closed) for cooling the ACV such that the temperature of the ACV decreases to a more suitable operating temperature.

Returning now to 806 of routine 800 in FIG. 8, upon learning the desired voltage and the desired current, routine 800 moves to 808 to estimate the temperature of the ACV. As such, the estimation method is based on the current flow, an amount of heat absorbed by the ACV, and an amount of heat dissipated to the surrounding environment. The following equation may be utilized to estimate the temperature of the ACV:

$$Q(k) = \left(I^2 * R - \frac{Q(k-1)}{T_h}\right) * dt$$

where,

Q may represent heat, I may represent current, R may represent electrical resistance, t may represent time, and $T_h$ may represent a lump time constant of heat transfer.

In this way, the electrical impedance of the ACV and its thermal conductivity to the surrounding environment may be used to determine a temperature of the ACV.

Thus, an example method for a boosted engine may comprise increasing an opening of an aspirator shut-off valve (ASOV) to allow motive flow through an aspirator in response to engine speed between a first, lower speed and a second, higher speed. Herein, the first, lower speed may be based on a transmission lugging limit and the second, higher speed may be based on redline speed. The method may further comprise closing the ASOV when engine speed is lesser than the first lower speed, and when engine speed is greater than the second, higher speed. The ASOV may be opened via flow of current to the ASOV, and wherein the ASOV may be closed upon discontinuing the flow of current. The method may include determining a voltage and the flow of current to open the ASOV based on an estimated underhood soak temperature, the underhood soak temperature estimated via inputs from one or more sensors. The method may further comprise closing the ASOV in response to a temperature of the ASOV exceeding a temperature threshold. The temperature of the ASOV may be based on an amount of heat generated by the flow of current to the ASOV and an amount of heat dissipated from the ASOV. The method may further comprise during boosted conditions, closing the ASOV in response to intake manifold pressure being higher than a throttle inlet pressure. It will be appreciated that the above example method may be for a boosted engine in a hybrid vehicle system.

Turning now to FIGS. 10A and 10B, they illustrate example routine 1000 for regulating an aspirator control valve (ACV) based on diagnosing an engine degradation condition, and also based on a modified engine operation responsive to the diagnosed engine degradation condition. Specifically, a position of the ACV may be based on the altered engine parameters in the modified engine operation.

As described earlier in reference to routine 300 of FIG. 3, detection of an engine and/or engine component degradation may result in a diagnostic trouble code (DTC) being set by the controller. Further, based on the engine and/or component degradation that has been detected, the controller may operate the engine in a management mode that is suitable for maintaining reliable engine operation even after detection of engine degradation. As such, the engine may be operated with modified operating parameters in the management mode. Further, the ACV may be regulated in a different manner in the management mode relative to ACV regulation when the engine operation is more robust without any identified degradation conditions.

At 1002, routine 1000 may determine if a DTC has been set. If not, routine 1000 proceeds to 1004 wherein the ACV position may be selected based on engine speed, temperature of the ACV, etc. as described earlier in reference to FIGS. 4, 5, 6, and 7.

However, if a DTC has been set by the controller, routine 1000 continues to 1006 to determine the type of engine degradation. Next, at 1008, routine 1000 may confirm if a first type of engine degradation has been identified. As an example, the first type of engine degradation may include degradation conditions that do not significantly affect engine operation. If yes, routine 1000 progresses to 1009 to activate a first management mode (or management mode 1). Management mode 1 may be a set of engine operating parameters for operating the engine responsive to detection of the first type of engine degradation (also termed, first engine degradation). Further, the first type of engine degradation may include an adjustment of engine operating parameters that may result in an increase in intake manifold vacuum.

At 1010, it may be confirmed if the first engine degradation includes indication of degradation of the MAF sensor. If yes, routine 1000 proceeds to 1012 to actively control air flow via the intake throttle. Further, air flow may be decreased to reduce torque in the engine.

As an example, air flow may be decreased by commanding a reduced opening of the intake throttle. For example, the opening of the intake throttle may be commanded to a reduced percentage opening of 40% (e.g. less than halfway open). Further, the opening of the intake throttle may not be allowed to increase to higher than 40%. In another example, the opening of the intake throttle may be commanded to be 30%. It will be appreciated that the degree of opening of the intake throttle may be 100% when fully open. Further, the degree of opening of the intake throttle when fully closed may be 0%. Thus, a 30% opening of the intake throttle may be a reduced opening relative to the 100% opening when the intake throttle is fully open.

Since a desired EGR flow rate may be based upon readings from the MAF sensor, degradation of the MAF sensor may lead to discontinuing EGR flow at 1014. For example, an EGR valve (such as EGR valve 80) may be adjusted to a closed position to terminate EGR flow into the intake manifold. Thus, in the above example, modified engine operation in response to detection of degradation in the MAF sensor includes reducing air flow through the intake throttle and closing the EGR valve.

Disabling flow of EGR may result in an increase in manifold vacuum levels since vacuum in the intake is not utilized to draw a portion of exhaust gas from the exhaust passage. As such, the engine may produce sufficient base vacuum. Therefore, at 1024, routine 1000 may confirm if intake manifold vacuum levels are higher than a first threshold, T_V. In one example, threshold T_V may be 15 inches of mercury. In another example, first threshold T_V may be 17 inches of mercury. If intake manifold vacuum is lower than first threshold T_V (level of intake manifold vacuum is less than T_V), routine 1000 progresses to 1026 where the ACV may not be adjusted and may be retained at its position. For example, the ACV may be maintained in an open position, if already open. Thus, vacuum may continue to be generated by the aspirator. Further, routine 1000 then returns to 1024.

If, however, it is determined at 1024 that intake manifold vacuum level is higher (e.g. deeper) than first threshold T_V, routine 1000 continues to 1034 to close (or maintain closed) the ACV. Routine 1000 may then end. Herein, sufficient vacuum is available in the intake manifold for supply to a vacuum reservoir, or a vacuum actuated device when demanded. Further still, additional air flow through the aspirator may not be desired, since additional torque may be generated due to the excess air. As such, excess torque may not be desired in the management mode or during modified engine operation.

Returning to 1010, if it is determined that the MAF sensor is not degraded, routine 1000 proceeds to 1016 to determine if a degradation of a variable valve timing (VVT) system is detected. If yes, routine 1000 continues to 1018 to control intake air flow into the cylinders by controlling the intake throttle. The VVT system may be returned to a default position at 1020 and at 1022, supplementary air flow into the intake manifold may be discontinued. Herein, modified engine operation includes disabling the VVT system and terminating supplementary air flow into the intake manifold. For example, the EGR conduit may be closed disabling EGR flow into the intake manifold, purge flow from the fuel system canister may be terminated, and/or air flow from the positive crankcase ventilation system may be ceased. Thus, the engine operation may be controlled in a more reliable manner.

By stopping flow of additional air and fuel vapors along with exhaust gases into the intake manifold (e.g. from fuel system canister), vacuum levels in the intake manifold may increase since base vacuum is not used to draw these air and fuel mixtures into the intake manifold. Routine 1000, therefore, may determine at 1024 if the vacuum levels in the intake manifold are higher (e.g. deeper) than threshold T_V. If intake manifold vacuum level is lower than threshold T_V, routine 1000 progresses to 1026 where the ACV may be retained in an open position, if already open. Thus, vacuum may continue to be generated by the aspirator. Further, routine 1000 then returns to 1024. If, however, it is determined at 1024 that intake manifold vacuum level is higher (e.g. deeper) than threshold T_V, routine 1000 continues to 1034 to close (or maintain closed) the ACV. Thus, it may be determined that the ACV may not be opened. Routine 1000 may then end.

Returning to 1016, if degradation of the VVT system is not diagnosed, routine 1000 proceeds to 1028 and determines that another type of first engine degradation has been detected. As such, routine 1000 depicts two examples of the first engine degradation condition such as degradation of the MAF sensor and degradation of the VVT system. If neither of the two examples is detected, another component of the engine may be degraded and may be determined to be a first engine degradation condition. As such, modified engine operation in response to the detection of the first engine degradation condition may include a rise in manifold vacuum levels. In alternative examples, base vacuum in the intake manifold may not increase in response to the modified engine operation resulting from identification of the first engine degradation condition.

Based on the other first engine degradation identified at 1028, an appropriate management mode may be activated with different engine operating parameters. At 1030, routine 1000 may determine if the ACV is to be closed in response to the modified engine operation. For example, the management mode that is activated in response to the other type of the first engine degradation determined at 1028 may demand that the ACV be closed. If yes, routine 1000 progresses to 1034 to close the ACV or to determine that the ACV may not be opened. If not, routine 1000 proceeds to 1032 to maintain the ACV at an open position. Alternately, it may determine that engine conditions do not demand closing the ACV.

It will be appreciated that the examples of MAF sensor degradation and VVT system degradation are included in routine 1000 as examples of the first engine degradation condition which may lead to a modified engine operation that can cause an increase in manifold vacuum levels. Other similar degradation conditions may be encountered which could be included under the first type of degradation condition without departing from the scope of this disclosure.

Thus, an example system for an engine may comprise an engine intake manifold, an intake throttle coupled in an intake passage, an aspirator coupled in a bypass air intake passage across the intake throttle, an aspirator control valve, positioned downstream of the aspirator in the bypass air intake passage, for regulating motive flow through each of the aspirator and the bypass air intake passage, a motive inlet of the aspirator coupled to the intake passage upstream of the intake throttle, a motive outlet of the aspirator coupled to the intake passage downstream of the intake throttle, and a controller with instructions in non-transitory memory and executable by a processor for, responsive to an indication of a first engine degradation condition, closing the aspirator control valve, and discontinuing generation of vacuum via the aspirator. The first engine degradation condition may include an increase in intake manifold vacuum level above a first threshold level. For example, management of the first engine degradation condition, as in routine 1000, may comprise an increase in vacuum levels in the intake manifold as described at 1024. The increase in vacuum levels may occur because one or more of EGR flow, canister purge flow, and PCV flow may be disabled. In one example, the first engine degradation condition may include degradation of a mass air flow (MAF) sensor (as shown in routine 1000). In another example, the first engine degradation condition may include degradation of a variable valve timing (VVT) system.

Returning to 1008, if it is determined that the engine degradation detected is not the first type, routine 1000 continues to 1036 to determine that a second type of engine degradation has been identified. As an example, the second type of engine degradation may include degradation conditions that considerably affect engine operation. Next, at 1037 a second management mode (e.g. management mode 2) may be activated. Management mode 2 may be a set of engine operating parameters for operating the engine responsive to detection of the second type of engine degradation (also termed, second engine degradation). In one example, the second type of engine degradation may include adjusting engine operating parameters such that they produce a decrease in intake manifold vacuum levels (or an increase in pressure in the intake manifold). It will be appreciated that management mode 2 may be different from management mode 1 at 1009.

At 1038, it may be confirmed if the second engine degradation includes an intake throttle that is stuck open. For example, the throttle may be stuck in a fully open or mostly open position and significant air flow may be entering the engine intake. If yes, routine 1000 continues to 1040 to disable and deactivate a plurality of sensors and actuators. In one example, the EGR valve may be disabled to a closed position. Further, measurements from an EGR sensor may be disregarded. Further still, the EGR sensor may be deactivated. Alternatively, measurements from other sensors may be disregarded by the controller in response to the detection of the stuck throttle. Further, at 1042, engine operation (e.g. torque produced) may be controlled by regulating fuel injection and/or by adjusting spark timing. For example, spark timing may be retarded to reduce engine torque. In another example, fuel injection amount may be reduced to decrease engine torque. Thus, modified engine operation in response to diagnosing an intake throttle stuck in the open position may include operating the engine with modified spark timing and/or fuel injection (e.g. injection timing, pulse width, etc.).

Next, at 1052, routine 1000 may determine if manifold vacuum levels have decreased below a second threshold, T_L. Since the intake throttle is stuck open, pressure in the intake manifold may increase resulting in a decrease in manifold vacuum levels. In one example, second threshold T_L may be 5 inches of mercury. In another example, second threshold T_L may be equivalent to atmospheric pressure. If it is determined that manifold vacuum levels are higher than the second threshold, T_L, routine 1000 continues to 1054 to maintain the ACV in its position. In one example, the ACV may be at a closed position and may therefore be retained in the closed position at 1054. On the other hand, if it is determined that intake manifold vacuum levels have decreased below the second threshold, T_L, routine 1000 proceeds to 1062 to determine that the ACV may be opened. As such, the ACV may be adjusted to an open position including fully open as well as mostly open positions. Therefore, in response to the increased pressure in the manifold and corresponding reduction in intake manifold vacuum levels, the ACV may be opened for vacuum generation. Specifically, an opening of the ACV may be increased in response to the intake throttle being stuck open.

Returning to 1038, if it is determined that the intake throttle is not stuck open, routine 1000 moves to 1044 to confirm if the throttle position sensor (TPS) is degraded. The TPS provides an indication of the position of the intake throttle to the controller (such as sensor 58 in FIGS. 1A and 1B). If yes, routine 1000 progresses to 1046 to maintain the intake throttle at a mostly open position. As an example, the intake throttle may be adjusted to the mostly open position wherein the degree of opening of the intake throttle is increased. For example, a percentage opening of the intake throttle may be 75%. In another example, the percentage opening of the throttle may be 85%. Further, the position of the intake throttle may be restrained from further adjustment that will reduce the degree of opening of the intake throttle.

As mentioned earlier, the degree of opening of the intake throttle may be 100% when fully open. Further, the degree of opening of the intake throttle when fully closed may be 0%. Thus, a 85% opening of the intake throttle may be a significantly increased opening relative to the 0% opening when the intake throttle is fully closed.

Since degradation of the TPS sensor render measurements from the TPS sensor unusable, the controller may adjust the intake throttle to the mostly open position for sufficient air flow into the engine cylinders. By maintaining the intake throttle in the mostly open (or fully open) position, the engine may continue to produce sufficient torque. As such, engine torque may be controlled via fuel cuts and/or spark timing adjustments. Next, at 1048, various sensors and actuators may be disabled. For example, the EGR valve may be disabled and adjusted to the closed position terminating EGR flow once the second engine degradation condition is identified. Further, measurements from multiple sensors may be disregarded. Further, measurements from the EGR sensor may be disregarded. Further, at 1050, torque production may be controlled by adjusting spark timing and/or fuel injection. Thus, the management mode in response to detecting a degraded TPS sensor may include adjusting the position of the intake throttle for higher air flow, and modifying spark timing, and fuel injection amongst other parameters to control torque.

Next, routine 1000 proceeds to 1052 where it may determine if manifold vacuum levels have decreased below the second threshold, T_L. Herein, since the intake throttle is held open, pressure in the intake manifold may increase (e.g. up to atmospheric pressure) leading to a decrease in manifold vacuum levels. In one example, second threshold T_L may be 3 inches of mercury. In another example, second threshold T_L may be 5 inches of mercury. If it is determined that manifold vacuum levels are higher than (or deeper than) the second threshold, T_L, routine 1000 continues to 1054 to maintain the ACV in its position. In one example, the ACV may be at a closed position and may therefore be retained in the closed position at 1054. In another example, if the ACV is a continuously variable valve, the ACV may be at a party open position. Herein, the ACV may be retained at its partly open position.

On the other hand, if it is determined at 1052 that intake manifold vacuum levels have decreased below the second threshold, T_L, routine 1000 proceeds to 1062 to determine that the ACV may be opened. As such, the ACV may be adjusted to an open position including fully open as well as mostly open positions. For example, if the initial position of the ACV is the partly open position, at 1062, the ACV may be altered to the fully open position. Therefore, in response to the increased pressure in the manifold (and resulting lower levels of intake manifold vacuum), the ACV may be opened to enable vacuum generation. Specifically, an opening of the ACV may be increased in response to the degradation of the throttle position sensor.

Returning to 1044, if degradation of the TPS is not diagnosed, routine 1000 proceeds to 1056 and determines that another type of second engine degradation has been detected. As such, routine 1000 depicts two examples of the second engine degradation condition such as degradation of the TPS and an intake throttle that is stuck open. If neither of these two examples is detected, another component of the engine may be degraded. For example, the second engine degradation condition may include degradation of one or more sensors providing input to the ACV control algorithm (e.g. routine 300 of FIG. 3). As one example, degradation of the engine speed (or crankshaft speed) sensor may be included in the second engine degradation condition. In the embodiments of FIGS. 1A and 1B, Hall effect sensor 118 (or other type) coupled to crankshaft 40 may provide measurements of engine speed. Degradation of Hall effect sensor 118 may affect control of the ACV since the position of ACV may be based on engine speed (e.g. routine 600 of FIG. 6). As another example, degradation of a manifold absolute pressure (MAP) sensor (such as sensor 122 of FIGS. 1A and 1B) may also be considered a second engine degradation condition. Degradation of the engine speed sensor or the MAP sensor may affect adjustments to the position of the ACV.

Engine operation may be modified in response to the detection of the second engine degradation condition wherein the second engine degradation condition includes degradation of one or more sensors providing input for ACV control. Based on the other second engine degradation identified at 1056, an appropriate management mode may also be activated with different engine operating parameters at 1056. The modified engine operation may produce a reduction in manifold vacuum levels. At 1058, routine 1000 may determine if the ACV is to be opened in response to the modified engine operation. For example, the management mode that is activated in response to the other type of second engine degradation may demand that the ACV be opened. To elaborate, since ACV position is largely based on feedback from one or more sensors (e.g. engine speed sensor, MAP, IAT), degradation of one or more of these sensors may result in increasing the opening of the ACV. To further elaborate, the ACV may not be maintained in a fully closed position in response to degradation of one or more sensors providing inputs to the ACV control algorithm. In one example, the ACV may be adjusted to a position midway between fully open and fully closed. In another example, the ACV may be adjusted to a mostly open position.

If it is determined at 1058 that the ACV is to be opened, routine 1000 progresses to 1062 to determine that the ACV can be opened. As such, the opening of the ACV may be increased. If not, routine 1000 proceeds to 1060 to maintain the ACV at a closed position. Alternately, it may determine at 1060 that engine conditions do not demand opening the ACV.

It will be appreciated that the examples of the intake throttle stuck open and degradation of the TPS are included in routine 1000 as examples of the second engine degradation condition which may lead to a modified engine operation that can cause a decrease in manifold vacuum levels. Other similar degradation conditions may be encountered which may be included under the second type of degradation condition without departing from the scope of this disclosure.

Thus, an example method for an engine may comprise opening an aspirator shut-off valve in response to diagnosing an engine degradation condition, the engine degradation condition including a decrease in intake manifold vacuum level below a threshold vacuum level. The example method may further comprise adjusting an engine operating parameter responsive to diagnosing the engine degradation condition. As described in routine 1000, one of fuel injection and spark timing may be adjusted in response to the diagnosis of the second engine degradation. One example of the engine degradation condition may include an intake throttle that is stuck in a mostly open position. Another example of the engine degradation condition may include degradation of an intake throttle position sensor.

It will be noted that the examples degradations cited above and the associated modified engine operation may be for a naturally aspirated engine such as engine 10 of FIG. 1A. While the example routine 1000 demonstrates two types of engine degradation (a first type and a second type), there may be additional types which may include different changes in engine operating conditions.

Thus, another example method for an engine may comprise closing an aspirator control valve (ACV) responsive to diagnosing a first engine degradation condition, and opening the ACV in response to diagnosing a second engine degradation condition, the second engine degradation condition being distinct from the first engine degradation condition. The first engine degradation condition may include an increase in intake manifold vacuum level above a first threshold level. An example of the first engine degradation condition may be degradation of a mass air flow (MAF) sensor. The method may further comprise discontinuing flow of exhaust gas recirculation (EGR) responsive to the degradation of the MAF sensor. Another example of the first engine degradation condition may include degradation of a variable valve timing system. Further, the second engine degradation condition may include a decrease in intake manifold vacuum level below a second threshold level. An example of the second engine degradation condition may include an intake throttle stuck in a mostly open position. The method may further comprise adjusting one or more of fuel injection and spark timing in response to the intake throttle being stuck in the mostly open position. Another example of the second engine degradation condition may include degradation of an intake throttle position sensor. Yet another example of the second engine degradation condition may include degradation of one or more sensors providing input to a control algorithm for the ACV. Example sensors herein may include an engine speed sensor and/or a MAP sensor. The ACV may be coupled to a bypass passage across an intake throttle, the bypass passage including an aspirator. In one example, the ACV may be a continuously variable valve. In another example, the ACV may be a binary valve.

Figure 11:
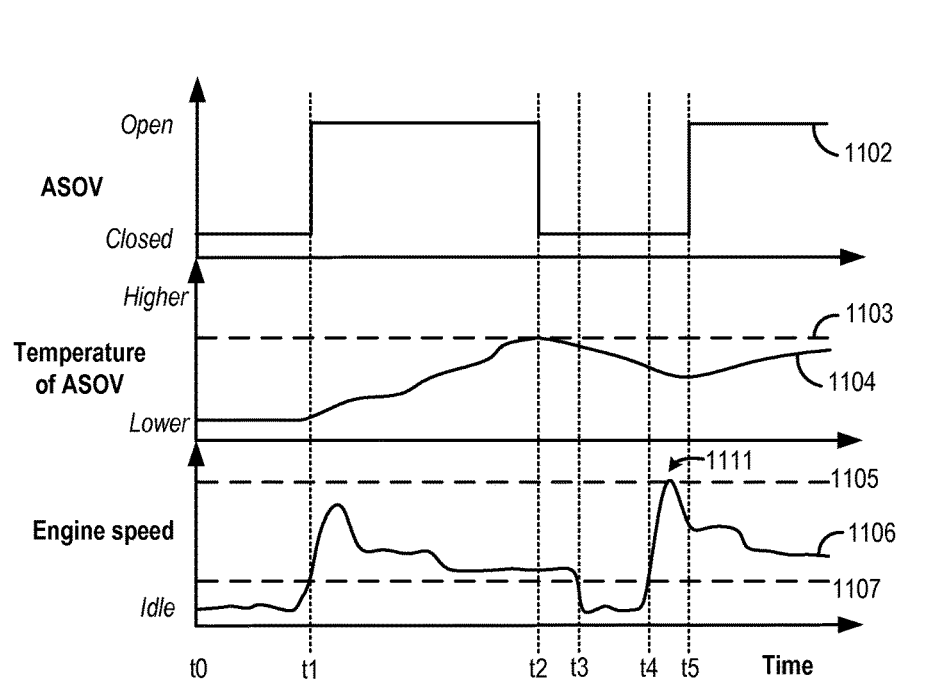
FIG. 11 shows an example control operation of the ASOV based on engine speed and the temperature of the ASOV, according to the present disclosure.

An example ASOV adjustment is now shown with reference to FIG. 11. In the example of FIG. 11, the ASOV adjustment is based on engine speed and the temperature of the ASOV. Map 1100 depicts the state of an ASOV at plot 1102, temperature of the ASOV at plot 1104, and engine speed at plot 1106. Time is plotted on the x-axis and time increases from left to right along the x-axis. The ASOV is shown as a binary valve that can be adjusted to either a fully open position or a fully closed position. ASOV may be an electrically actuated solenoid valve. In other embodiments, the ASOV may be a continuously variable valve capable of assuming positions between fully open and fully closed. Further, line 1103 represents a temperature threshold (such as Thresh_T of FIG. 7). Furthermore, line 1107 represents a first, lower speed (such as Sp_1 of FIGS. 5 and 6) and line 1105 represents a second, higher speed, such as Sp_2 of FIGS. 5 and 6. As mentioned earlier, the first, lower speed (Sp_1) may be based on a transmission lugging limit, while the second, higher speed (Sp_2) may be based on redline speed for the given engine. As such, the ASOV may be coupled in either a naturally aspirated engine or a forced induction engine within either a hybrid vehicle or a non-hybrid vehicle.

Between t0 and t1, the engine may be idling as shown by plot of engine speed at idle speed. In one example, the engine may have been cold started. The ASOV may be closed during idling conditions (plot 1102), particularly at cold cranking to stabilize air-fuel ratio calculations. Further, since the ASOV is electrically actuated, maintaining the ASOV at the closed position may reduce current draw from the battery when battery charge may be lower as at a cold start. As mentioned earlier, the default position of the ASOV may be a closed position wherein current may not flow to the ASOV. Accordingly, temperature of the ASOV is lower between t0 and t1.

At t1, engine speed may increase sharply as the vehicle is accelerated. Since engine speed is now above the first, lower speed (line 1107) while remaining below the second, higher speed (line 1105), the ASOV may be opened at t1. As the ASOV is now actuated to the open position by a flow of current, its temperature may rise gradually as shown by plot 1104. At t2, ASOV temperature may reach the temperature threshold (line 1103). In response to the temperature of the ASOV reaching the temperature threshold, the ASOV may be closed at t2 by ceasing current flow to the ASOV. The ASOV may be closed at t2 even though the engine speed is within the desired range, e.g. between the first, lower speed and the second, higher speed. Thus, the position of the ASOV based on engine speed may be overridden by the temperature of the ASOV increasing above the temperature threshold. As such, a resting period may be enabled at t2 for the ASOV to cool down. Accordingly, ASOV temperature may reduce after t2.

At t3, engine speed also decreases below the first, lower speed (line 1107), possibly as the vehicle slows down. Further, engine may be spinning at idle speed between t3 and t4. In response to engine speed being lower than the first, lower speed threshold, the ASOV is maintained closed between t3 and t4. At t4, the engine speed rises sharply and momentarily reaches the second, higher speed as shown at 1111. Therefore, the ASOV may not be opened until engine speed stabilizes between the first, lower speed and the second, higher speed, such as at t5. It will be noted that at t5, the temperature of the ASOV is also lower than the temperature threshold allowing current flow to the ASOV for opening the ASOV. The ASOV may be maintained open past t5 since engine speed remains between the first, lower speed and the second, higher speed, and the temperature of the ASOV also remains below the temperature threshold.

In this way, an example method of controlling the aspirator control valve (ACV) may include adjusting an opening of the ACV based on engine speed, and overriding the adjusting responsive to a change in engine conditions. For example, the adjusting may include increasing the opening of the ACV in response to engine speed being higher than a first speed (Sp_1) and lower than a second speed (Sp_2). In one example, the change in engine conditions may include a change in engine speed, and wherein the overriding includes closing the ACV in response to the change in engine speed (such as at t3 of map 1100). The change in engine speed may include one of the engine speed decreasing below the first speed and engine speed increasing above the second speed. In another example, the change in engine conditions may include the temperature of the ASOV exceeding a temperature threshold, and wherein the overriding includes closing the ASOV. Specifically, the ASOV position may be adjusted to a fully closed position (from either a mostly open or fully open position) responsive to the temperature of the ACV exceeding the temperature threshold.

Figure 12:
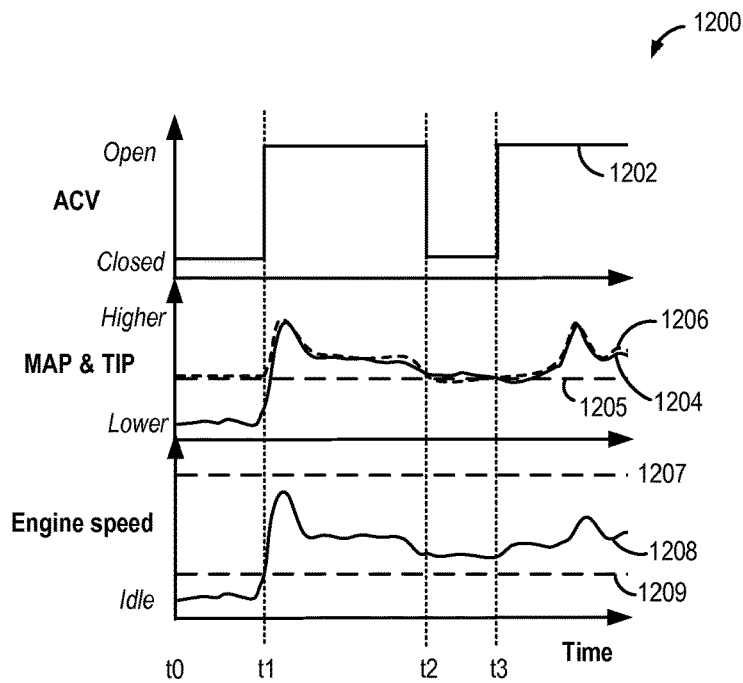
FIG. 12 presents an example control operation of the ASOV based on a change in intake manifold pressure.

Turning now to FIG. 12, an example ACV adjustment based on engine speed and changes in manifold pressure is shown. Map 1200 depicts the state of an ACV at plot 1202, manifold pressure (MAP) at plot 1204, throttle inlet pressure (TIP) at plot 1206 (short dashes), and engine speed at plot 1208. Time is plotted on the x-axis and time increases from left to right along the x-axis. The example ACV shown is a binary valve that can be adjusted to either a fully open position or a fully closed position. In other embodiments, the ACV may be a continuously variable valve capable of assuming positions between fully open and fully closed. Further, line 1205 represents barometric pressure (BP), line 1209 represents a first, lower speed (such as Sp_1 of FIGS. 5 and 6) and line 1207 represents a second, higher speed, such as Sp_2 of FIGS. 5 and 6. As mentioned earlier, the first, lower speed (Sp_1) may be based on a transmission lugging limit, while the second, higher speed (Sp_2) may be based on redline speed for the given engine. As such, the example ACV may be coupled in a forced induction engine within either a hybrid vehicle or a non-hybrid vehicle.

Between t0 and t1, the engine may be idling as shown by plot 1208. The ACV may be closed during idling conditions (plot 1202) to maintain a desired air flow to stabilize air-fuel ratio and emissions. Since the engine is idling, the intake throttle may be closed resulting in lower manifold pressure conditions (plot 1204). Further, TIP may be at or close to atmospheric (as shown by plot 1206 and line 1205) since the engine may not be boosted when idling. Thus, TIP (plot 1206) is higher than MAP (plot 1204) between t0 and t1.

At t1, engine speed may rise steeply resulting in an increase in engine torque that may be utilized for vehicle propulsion. For example, the vehicle may be accelerating to merge with traffic on a highway. As such, the engine may now be boosted resulting in the increase in TIP as well as MAP. Further, each of TIP and MAP may now be higher than barometric pressure. In the example shown, the intake throttle may be mostly open allowing the MAP to be substantially similar to TIP. Further still, the ACV may be opened at t1 as the engine speed is higher than the first, lower speed (line 1209) and lower than the second, higher speed (line 1207). Since the intake manifold vacuum level may be lower due to boosted engine operation, opening the ACV may enable vacuum generation. Engine speed remains between the first lower speed and the second higher speed between t1 and t2, so the ACV may be maintained open in the same duration. Accordingly, with the ACV held open, motive flow may be directed through the aspirator from downstream of the compressor (and upstream of the intake throttle). Further, vacuum generated at the throat of the aspirator may be drawn into the brake accumulator and the vacuum reservoir.

Between t1 and t2, boosted conditions may stabilize and MAP may be about the same as TIP or may be lower than TIP. At t2, boosted conditions may be reduced as engine speed decreases slightly, but engine speed remains between the first, lower speed (line 1209) and the second, higher speed (line 1207). As the engine exits boosted conditions, TIP may reduce faster and may be substantially equivalent to BP at t2. However, MAP may decrease at a slower rate than TIP. Consequently, MAP may be higher than TIP between t2 and t3. Further, a likelihood of grey air recirculation and residue formation at cooler regions of the intake may increase with MAP being higher than TIP (and BP as shown). Accordingly, the ACV is closed at t2, until MAP reduces below TIP rises at t3. The ACV may be opened at t3 as TIP is higher than MAP. The ACV may be maintained open for vacuum generation as long as engine speed is between the first, lower speed and the second, higher speed. If the MAP is higher than the TIP, the position of the ACV is overridden and the ACV is adjusted to the closed position (e.g. fully closed) from an open (e.g. fully open) position.

Figure 13:
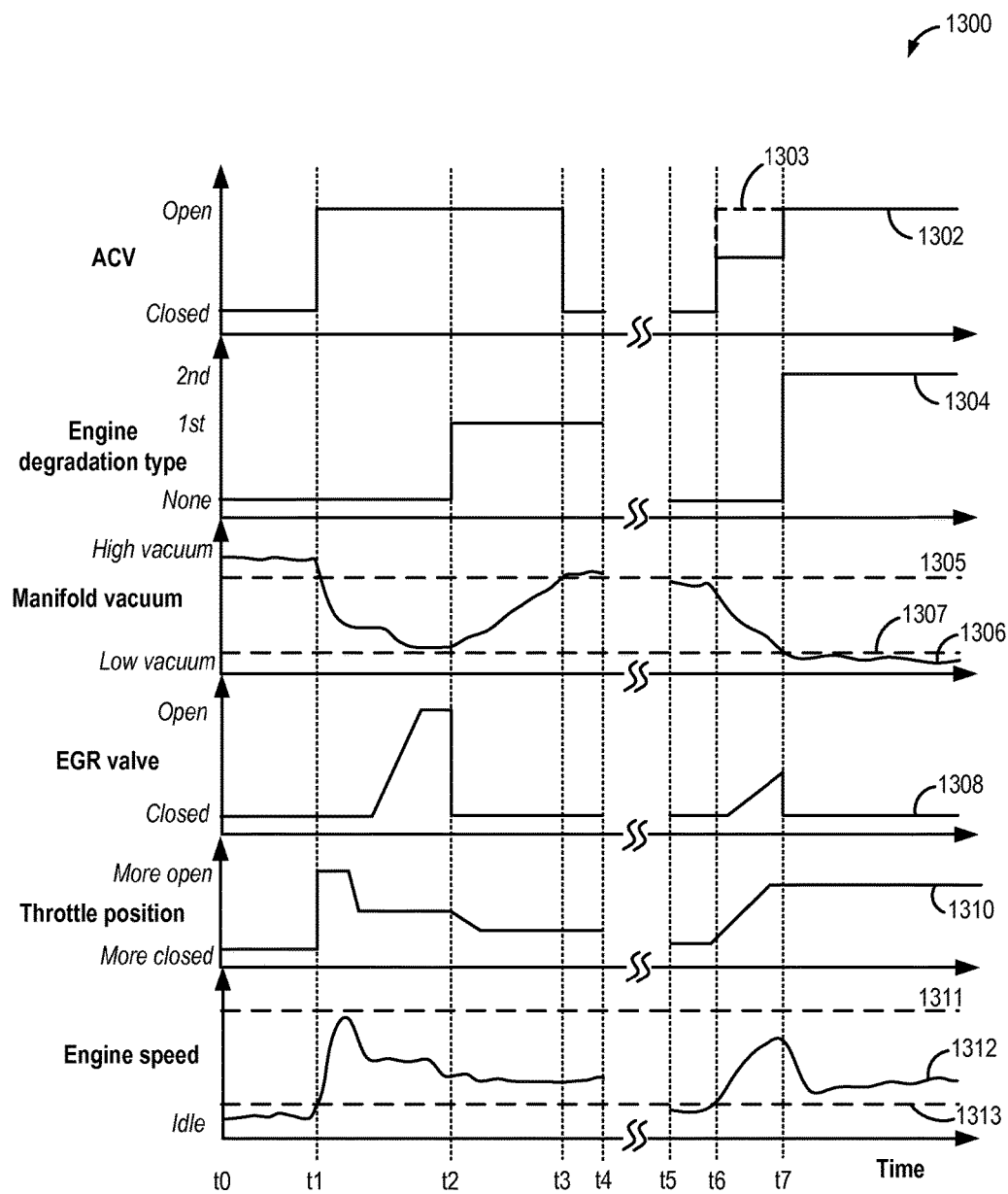
FIG. 13 depicts an example control operation of the ASOV based on a detected engine degradation condition.

Map 1300 of FIG. 13 depicts an example ACV adjustment based on engine speed and detection of engine degradation conditions. As such, identification of engine degradation may result in a modified engine operation with distinct engine parameters. Modified engine operation may be termed a management mode. Accordingly, the ACV may be adjusted in response to engine conditions based on the modified engine operation. Map 1300 depicts state of the ACV at plot 1302, engine degradation condition type at plot 1304, manifold vacuum levels at plot 1306, EGR valve position at plot 1308, intake throttle position at plot 1310, and engine speed at plot 1312. Time is plotted on the x-axis and time increases from the left to the right along the x-axis. The example ACV may be a continuously variable valve capable of assuming positions between fully open and fully closed. Alternatively, the example ACV may be a binary valve that can be adjusted to either a fully open position or a fully closed position. Further, line 1305 represents a first threshold for intake manifold vacuum level (e.g. first threshold T_V of FIG. 10A), line 1307 represents a second threshold for intake manifold vacuum level (e.g. second threshold T_L of FIG. 10B), line 1313 represents a first, lower engine speed (such as Sp_1 of FIGS. 5 and 6) and line 1311 represents a second, higher engine speed, such as Sp_2 of FIGS. 5 and 6. As mentioned earlier, the first, lower engine speed (Sp_1) may be based on a transmission lugging limit, while the second, higher engine speed (Sp_2) may be based on redline speed for the given engine. As such, the example ACV may be coupled in a naturally aspirated engine within either a hybrid vehicle or a non-hybrid vehicle.

Between t0 and t1, the engine speed may be at idle with the intake throttle at a more closed (e.g. fully closed) position. Accordingly, intake manifold vacuum levels may be considerably higher (or deeper). The EGR valve may be closed during idle conditions. The ACV may also be closed because the engine is idling (to reduce air-fuel ratio errors) and sufficient intake manifold vacuum is available. Further, between t0 and t1, engine degradation has not been detected.

At t1, engine speed increases rapidly in response to torque demand for vehicle propulsion from rest. The intake throttle may be at wide open position (or more open position, as shown by plot 1310) to provide substantial air flow. The EGR valve may be closed during wide open throttle conditions (plot 1308). The ACV, though, may be opened at t2 since engine speed is between the first, lower speed and the second higher speed. Furthermore, a rapid decrease in manifold vacuum levels may be observed during wide open throttle conditions.

Between t1 and t2, the intake throttle may be adjusted to a position between more open and more closed (e.g. halfway between fully open and fully closed), intake manifold vacuum levels may stabilize, and the engine speed may settle between the first lower speed (line 1313) and the second, higher speed (line 1311). The ACV may be retained at its open position to generate vacuum, as intake manifold vacuum levels are lower. Between t1 and t2, as the engine speed stabilizes, the EGR valve may be opened to enable a reduction in NOx emissions. As the EGR valve is opened gradually, intake manifold vacuum may reduce as the manifold vacuum is used to draw EGR gases into the intake. As depicted, intake manifold vacuum may substantially reach the second threshold (line 1307) at t2.

At t2, the controller may detect a first engine degradation condition (plot 1304). In one example, degradation may be detected in a MAF sensor. In another example, degradation in the VVT system may be identified. Accordingly, the intake throttle may be gradually adjusted towards the more closed position reducing air flow. It will be noted that the intake throttle is not fully closed. As mentioned earlier, the degree of opening of the intake throttle may be 40%. In another example, the degree of opening of the intake throttle may be 30%. The engine speed may gradually fall while continuing to remain between the first, lower speed and the second, higher speed. In response to the detection of the first engine degradation, the EGR valve may also be closed (plot 1308) at t2 to reduce excessive air flow into the intake. In response to the adjustment of the intake throttle towards more closed and the closure of the EGR valve, intake manifold vacuum levels rise gradually such that at t3, intake manifold vacuum may be higher than the first threshold (line 1305). Since there is sufficient vacuum in the intake manifold, and excessive air flow may not be desirable, the ACV may be closed at t3 and may remain closed thereafter.

Between t4 and t5, a duration of time may pass wherein the first engine degradation condition may be resolved and remedied. For example, the degraded sensors or degraded systems may be repaired. Thus, at t5, a distinct drive cycle may ensue wherein the engine is robust. Between t5 and t6, engine speed is lower than the first, lower speed (line 1313) and the intake throttle is at the more closed position. Accordingly, intake manifold vacuum level is higher (e.g. deeper) and the ACV is closed since engine speed is lower than the first, lower speed. The EGR valve is closed and no degradation is detected.

At t6, engine speed rises gradually and stabilizes between the first, lower speed and the second, higher speed as the intake throttle is opened to a position between mostly open and mostly closed. As shown, the opening of the intake throttle may be increased to moderately open from the more closed position at t5. Simultaneously, due to the increased opening of the intake throttle, intake manifold vacuum levels may decrease between t6 and t7, and the ACV may be opened for vacuum generation. As depicted in the example, the ACV may be opened partly such that the ACV may be at a position between fully open and fully closed. This may be possible with a continuously variable ACV. Alternatively, the ACV may be adjusted to the fully open position, if a binary valve, as shown by dashed line 1303. As such, opening the ACV between the first, lower speed and the second, higher speed ensures that the excess air flow does not adversely affect air-fuel ratio control. The EGR valve may be gradually opened past t6.

At t7, the controller may detect and signal a second, engine degradation condition (plot 1304). In the depicted example, the second engine degradation condition may include the intake throttle being stuck open (plot 1310). In another example, the second engine degradation condition may include detection of a degraded throttle position sensor, such as sensor 58 in FIGS. 1A and 1B.

In response to the signaling of the second engine degradation condition at t7, a modified engine operation may be initiated wherein engine parameters may be adjusted to provide reliable engine operation. For example, since the intake throttle is stuck in a mostly open position allowing a larger proportion of air to flow into the engine, torque production may be controlled by adjusting spark timing and/or fuel injection (e.g. injection timing, pulse width, etc.). Further, in response to the signaling of the second engine degradation condition, the EGR valve may be closed at t7. With the modified engine operation and adjusted spark timing and/or fuel injection, engine speed may reduce after t7. However, engine speed may remain higher than the first, lower speed. Further, with the intake throttle being mostly open, intake manifold vacuum levels may decrease below the second threshold (line 1307). In response to intake manifold vacuum levels reducing below the second threshold at t7, the ACV may be opened (or maintained open) for vacuum generation. As shown in map 1300, the ACV may be opened to the fully open position at t7. This may occur in an ACV that is continuously variable.

In this way, an example method for an engine may comprise determining a first position of an aspirator shut-off valve (ASOV) responsive to engine speed, and adjusting the first position of the ASOV based on detection of an engine degradation condition. The first position of the ASOV may include a mostly open position responsive to engine speed being higher than a first speed (line 1313 of map 1300) and lower than a second speed (line 1311 of map 1300), and wherein adjusting the first position includes adjusting the ASOV to a mostly closed position when a first engine degradation condition is detected (e.g. at t3 in map 1300). The first engine degradation condition may include an increase in intake manifold vacuum above a first threshold level (e.g. plot 1306 at t3 in map 1300). In another example, the first position of the ASOV may include a partly open position as at t6 in map 1300 (plot 1302), and wherein the adjusting includes adjusting the ASOV to a fully open position when a second engine degradation condition is detected (as at t7 in map 1300). An example of the second engine degradation condition may include a decrease in intake manifold vacuum below a second threshold level such as due to a throttle stuck in the mostly open position.

Figure 14:
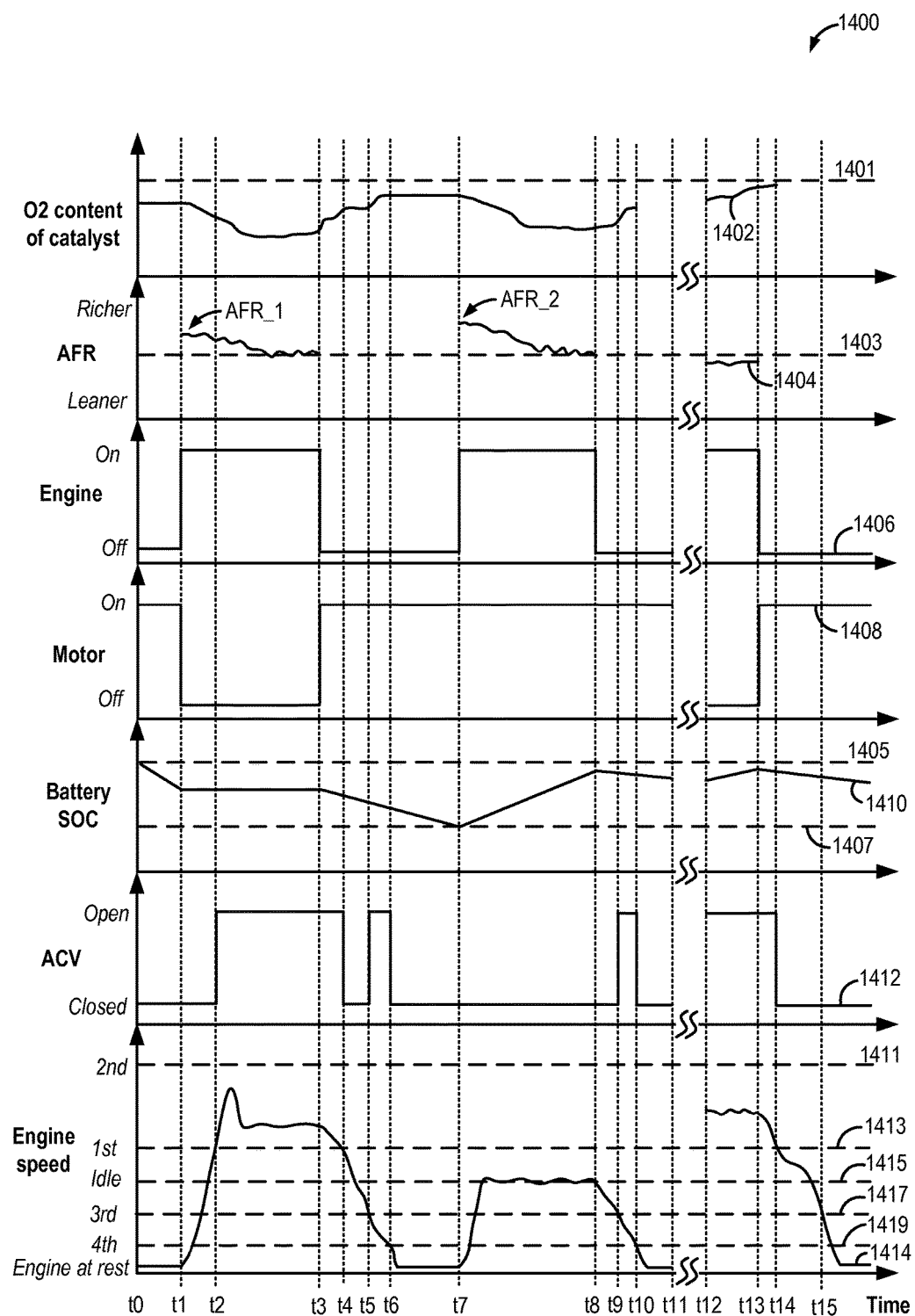
FIG. 14 illustrates an example control operation of the ASOV when included in the HEV system of FIG. 2.

FIG. 14 presents map 1400 illustrating an example aspirator control valve (ACV) adjustment in response to engine speed and oxygen content in an emission control device. The ACV in the depicted example may be coupled in an engine (e.g. naturally aspirated engine, forced induction engine) included in a hybrid electric vehicle (HEV). The hybrid electric vehicle may be a series hybrid, a parallel hybrid, or a series-parallel hybrid vehicle. Map 1400 presents changes in an oxygen content of a catalyst at plot 1402, air-fuel ratio (AFR) at plot 1404, engine operation at plot 1406, motor/generator operation at plot 1408, changes in a battery state of charge (SOC) at plot 1410, state of the ACV at plot 1412, and engine speed at plot 1414.

Time is plotted on the x-axis, and time increases from the left of the x-axis to the right of the x-axis. The example ACV shown is a binary valve that can be adjusted to either a fully open position or a fully closed position. In other embodiments, the ACV may be a continuously variable valve capable of assuming positions between fully open and fully closed. Map 1400 further includes line 1401 representing a threshold oxygen content in the catalyst (such as Threshold_1 of FIG. 5), line 1403 representing stoichiometric AFR, line 1405 representing a first higher SOC threshold for battery SOC and line 1407 representing a second lower SOC threshold for battery SOC, line 1411 representing a second, higher engine speed (Sp_2), line 1413 representing a first, lower engine speed (Sp_1), line 1415 indicating idle speed (e.g. 900 RPM), line 1417 representing a third engine speed (Sp_3), and line 1419 indicating a fourth engine speed (Sp_4). As described earlier in reference to FIG. 5, the third engine speed may be a speed lower than idle speed for the given engine. The fourth engine speed may be an engine speed that is nominally higher than that at an engine shut down. As an example, engine speed at engine shut down may be 50 RPM. Herein, an example fourth engine speed may be 100 RPM.

Between t0 and t1, the hybrid vehicle system may be operating in an engine-off mode (plot 1406) with the hybrid vehicle being propelled using motor torque (plot 1408). Since the engine is shut down and at rest, there is no change in the oxygen content of the catalyst (plot 1402), the ACV is maintained closed, and the AFR is not plotted. Further, since the motor is powering vehicle motion, battery SOC may gradually reduce between t0 and t1.

At t1, the engine may be commanded "ON". For example, the engine may be activated when an operator torque demand increases. The motor may be turned "OFF" at t1 (if motor torque is not required), as shown. In another example, the motor may continue to be operated (e.g., at a reduced speed) to provide a reduced motor torque demand. As the motor is deactivated, the battery SOC does not change between t1 and t3 whereupon the motor may be re-activated. Further, at t1, the engine may be operated with a richer than stoichiometric AFR (AFR_1 of plot 1404) for improved combustion and catalyst performance. In response to the engine combusting at richer than stoichiometric AFR, the oxygen content of the catalyst reduces. Further still, the engine speed may transition from rest through idle speed into the range between the first, lower speed (Sp_1) represented by line 1413 and the second, higher speed (Sp_2) indicated by line 1411. As shown, engine speed attains a speed between line 1411 and line 1413 at t2 whereupon the ACV is opened from its previous closed position. The ACV may be maintained open in the duration that engine speed remains between the desired range (e.g. between Sp_1 and Sp_2). As explained earlier in reference to map 1100, an increase in the temperature of the ACV may result in closing the ACV irrespective of engine speed (e.g. not based on engine speed), though this scenario is not shown in the example operation of map 1400.

At t3, an engine shut down may be commanded and the engine may be deactivated while simultaneously activating the motor. Accordingly, battery SOC may reduce past t3. As the engine slows down and engine speed falls below the first, lower speed (Sp_1) at t4, the ACV may be closed. The ACV may remain closed as engine speed transitions from the first, lower speed past idle speed. It will be noted that oxygen content in the catalyst is sufficiently below the oxygen content threshold (line 1401) when the engine is switched off at t3. As engine speed reaches the third speed (Sp_3 indicated by line 1417) at t5 and decreases, the ACV may be actuated open at t5 for additional vacuum generation. As such, the intake throttle may be closed once engine shut down is commanded. By allowing a smaller air flow through the aspirator, vacuum may be generated before the engine reaches rest while nominally pumping air into the catalyst. Since the oxygen content in the catalyst is lower than the oxygen content threshold, the catalyst may be able to store additional oxygen from the excess air flow through the aspirator. Therefore, the ACV may be opened at t5. In response to the engine speed falling below the fourth speed at t6, the ACV may be closed. It will be observed that oxygen content in the catalyst increases due to the excess air flowing into the catalyst when the ACV is open between t5 and t6. As will be noted, the fourth speed is just higher than an engine at rest.

The engine may be at rest between t6 and t7 while the vehicle is being propelled primarily by the motor. Battery SOC decreases gradually from t3 as the motor is entirely responsible for vehicle motion, and at t7 battery SOC reaches the second lower SOC threshold (line 1407) whereupon the engine may be activated for battery regeneration. At t7, the engine is commanded "ON" and engine speed rises from rest to idle and remains at idle (e.g. 900 RPM) as the battery is charged. Since engine speed does not reach the desired range, between the first, lower speed (line 1413) and the second, higher speed (line 1411), the ACV is maintained closed between t7 and t9. Herein, the engine may not propel the vehicle but may be primarily used for battery regeneration. Accordingly, battery SOC rises between t7 and t8.

It will also be noted that the initial AFR (AFR_2) when the engine is commanded "ON" at t7 is richer than the initial AFR (AFR_1) when the engine is commanded "ON" at t1. The AFR at t7 may be richer than that at t1 since there may be excess oxygen stored in the catalyst during the engine shutdown phase between t5 and t6. As depicted in map 1400, oxygen content at t1 is lower than oxygen content at t7. As will be observed, oxygen content at t6 is higher than the oxygen content stored at t5 due to excess air flow received at the catalyst from the aspirator. For example, the stored oxygen content at t0 (and the resulting AFR at t1) may be lower than the stored oxygen content at t6 (and the resulting AFR at t7) since the ACV may not be opened for vacuum generation following the previous engine shutdown.

At t8, the battery SOC is close to the first higher SOC threshold (line 1405), but not at the first higher SOC threshold allowing a margin for battery recharging during braking events in the electric mode (engine-off mode). In response to the battery SOC being close to the first higher SOC threshold, a shutdown command may be communicated to the engine at t8. The engine may then spin unfueled to rest. As engine speed falls from idle speed to the third speed at t9, the ACV may be actuated open. It will be noted that oxygen content in the catalyst is substantially below the threshold oxygen content at t9. Accordingly, the ACV is opened for vacuum generation at t9. Thus, the position the ACV may be adjusted based on engine speed being between the third speed and the fourth speed, as well as the oxygen storage capacity of the catalyst. The ACV remains open for a brief period between t9 and t10 and in response to the air flowing into the catalyst, oxygen content in the catalyst increases between t9 and t10. At t10, engine speed reduces below the fourth speed and may reach rest by t11. In response to engine speed reaching the fourth speed at 10, the ACV is also closed at t10.

Between t11 and t12, a duration of HEV operation may elapse including an engine-on duration. As such, the duration of HEV operation with the engine-on condition is not shown in FIG. 14. At t12, the engine may be operating and propelling the vehicle while the motor is "OFF". Further, since engine speed is between the first, lower speed (line 1413) and the second, higher speed (line 1411) at t12, the ACV is open. Further still, the AFR may be nominally leaner than stoichiometric resulting in a gradual increase in the oxygen content of the catalyst between t12 and t13.

At t13, an engine shut down command may be issued and the engine may be turned "OFF" as the motor is activated for vehicle propulsion. The ACV may be maintained open until t14 when engine speed reduces below the first, lower speed (line 1413). Oxygen content in the catalyst continues to increase until t14 due to air flow received via the aspirator as the ACV is open. At t14, the ACV may be closed since the engine speed is lower than the first, lower speed. As engine speed falls past idle speed, and reduces below the third speed (line 1417) at t15, the ACV may remain closed since oxygen content in the catalyst is substantially at the oxygen content threshold (line 1401). Thus, the ACV position may be adjusted responsive to the oxygen content of the catalyst. As such, the ACV may not be opened following a shutdown command to the engine when engine speed is between the third speed and the fourth speed if the oxygen content of the catalyst is substantially at the oxygen content threshold.

An intake throttle of the engine (not shown in FIG. 14) may be adjusted to a fully closed position in response to the engine shutdown command at t13. It will be noted that the ACV is depicted as closing at t14 even though the engine shutdown command is issued at t13. However, the time period between t13 when engine shutdown is commanded and t14 when engine speed reduces below the first, lower engine speed (line 1413) may be brief. Thus, the ACV may be adjusted to its fully closed position (from open) at substantially the same time as the intake throttle is moved to its fully closed position since the duration between t13 and t14 may be short.

Thus, an example method for an engine in a hybrid vehicle may comprise, during an engine-on condition for vehicle propulsion, opening an aspirator shut-off valve (ASOV) between a first engine speed (Sp_1) and a second engine speed (Sp_2), the first engine speed being lower than the second engine speed, and following a first shutdown command to the engine, opening the ASOV between a third engine speed (Sp_3) and a fourth engine speed (Sp_4), the fourth engine speed nominally higher than an engine stop. The method may further comprise, during the engine-on condition for vehicle propulsion, closing the ASOV responsive to a temperature of the ASOV exceeding a temperature threshold. The method may also comprise, following the first shutdown command to the engine, opening the ASOV responsive to an oxygen content of an emission catalyst being lower than a threshold. The method may further include, during an engine restart following the first shutdown command, operating the engine with a richer than stoichiometric air-fuel ratio. The method may additionally comprise, following a second shutdown command to the engine, closing the ACV irrespective of engine speed. Herein, the ACV may not be opened because the oxygen content in the emission catalyst is at or near the oxygen content threshold. The ASOV may be closed synchronously with closing of an intake throttle of the engine in the hybrid vehicle.

In this way, an aspirator control valve (ACV) may be regulated based on engine speed. By modulating the ACV based on engine speed, operation of the aspirator and the ACV may be reliably tested during vehicle emissions tests. As such, using engine speed as the parameter to decide ACV position may enable a more simplified ACV control algorithm. Further, the position of the ACV selected based on the engine speed may be altered based on a temperature of the ACV, and modified engine operation responsive to engine degradation diagnoses. By closing the ACV when the temperature of the ACV exceeds a temperature threshold, ACV degradation may be reduced while enhancing its operation. By adjusting the ACV position based on modified engine operation responsive to engine degradation conditions, issues such as air flow errors and low vacuum may be addressed. Furthermore, an ACV in a hybrid vehicle may also be regulated based on engine speed following an engine shutdown and an oxygen content in an emission catalyst. Accordingly, catalyst performance may be enhanced while ensuring emissions compliance and providing sufficient vacuum.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   operating the engine with compressed air from an intake compressor and an intake manifold pressure less than or equal to a throttle inlet pressure and an engine speed between a first, lower speed and a second, higher speed; and
   during engine operation with compressed air from the intake compressor, and the intake manifold pressure less than or equal to the throttle inlet pressure, increasing an opening of an aspirator shut-off valve (ASOV) to allow motive flow through an aspirator responsive to the engine speed between the first, lower speed and the second, higher speed;
   operating the engine at idle speeds, without compressed air; and
   responsive to the engine operating at idle speeds, closing the ASOV.

2. The method of claim 1, wherein the first, lower speed is based on a transmission lugging limit and the second, higher speed is based on a redline speed.

3. The method of claim 1, further comprising closing the ASOV when the engine speed is less than the first, lower speed and when the engine speed is greater than the second, higher speed.

4. The method of claim 1, wherein the idle speeds are less than the first, lower speed and the second, higher speed, wherein the ASOV is opened via a flow of current to the ASOV, and wherein the ASOV is closed upon discontinuing the flow of current.

5. The method of claim 4, wherein a voltage and the flow of current to open the ASOV are determined based on an estimated underhood soak temperature, the underhood soak temperature estimated via inputs from one or more sensors.

6. The method of claim 5, further comprising closing the ASOV in response to a temperature of the ASOV exceeding a temperature threshold while the engine speed is between the first, lower speed and the second, higher speed.

7. The method of claim 6, wherein the temperature of the ASOV is based on an amount of heat generated by the flow of current to the ASOV and an amount of heat dissipated from the ASOV.

8. The method of claim 1, further comprising, during an exit from engine operation with compressed air, closing the ASOV in response to the intake manifold pressure being higher than the throttle inlet pressure while the engine speed is between the first, lower speed and the second, higher speed, wherein the throttle inlet pressure is measured downstream of the intake compressor between an intake throttle and the intake compressor.

9. A vehicle system, comprising:
   an engine, including an intake throttle;
   a boost device including a compressor, the compressor positioned in an intake passage upstream of the intake throttle;
   an aspirator coupled in a compressor bypass passage;
   an aspirator shut-off valve (ASOV), positioned upstream of the aspirator in the compressor bypass passage, regulating motive flow through each of the aspirator and the compressor bypass passage;
   a motive inlet of the aspirator coupled to the intake passage downstream of the compressor;
   a motive outlet of the aspirator coupled to the intake passage upstream of the compressor; and
   a controller with instructions on non-transitory memory that when executed by a processor cause the controller to:
      operate the engine with compressed air from the compressor, and during said operation,
      adjust an opening of the ASOV based on engine speed; and
      override the adjusting responsive to a change in engine conditions;
      operate the engine at idle speeds, without compressed air; and
      responsive to the engine operating at idle speeds, close the ASOV.

10. The vehicle system of claim 9, wherein the adjusting includes increasing the opening of the ASOV in response to the engine speed being higher than a first speed and lower than a second speed.

11. The vehicle system of claim 10, wherein the change in engine conditions includes a change in engine speed, and wherein the overriding includes closing the ASOV in response to the change in engine speed.

12. The vehicle system of claim 11, wherein the change in engine speed includes one of the engine speed decreasing below the first speed and the engine speed increasing above the second speed.

13. The vehicle system of claim 12, wherein the controller includes further instructions that when executed cause the controller to close the ASOV in response to the engine speed decreasing below the first speed when the vehicle system is at rest.

14. The vehicle system of claim 10, wherein the change in engine conditions includes a change in a temperature of the ACV, and wherein the overriding includes adjusting a ASOV position to a fully closed position responsive to the temperature of the ASOV exceeding a temperature threshold.

15. The vehicle system of claim 10, wherein the change in engine conditions includes a change in intake manifold pressure, and wherein the overriding includes closing the ASOV responsive to intake manifold pressure being higher than a throttle inlet pressure.

16. The vehicle system of claim 10, wherein the change in engine conditions includes a determination of a first engine degradation condition, and wherein the overriding includes closing the ASOV responsive to the determination of the first engine degradation condition.

* * * * *